US012656901B2

(12) United States Patent
Choi et al.

(10) Patent No.: US 12,656,901 B2
(45) Date of Patent: Jun. 16, 2026

(54) TOUCH SENSOR INCLUDING AUXILIARY LINE OVERLAPPING SENSOR ELECTRODE AND DISPLAY DEVICE INCLUDING THE SAME

(71) Applicant: Samsung Display Co., Ltd., Yongin-Si (KR)

(72) Inventors: Jae Woo Choi, Yongin-si (KR); Jun Young Ko, Yongin-si (KR); Tae Joon Kim, Yongin-si (KR); Gyeong Nam Bang, Yongin-si (KR); Hye Yun Han, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 168 days.

(21) Appl. No.: 18/406,481

(22) Filed: Jan. 8, 2024

(65) Prior Publication Data

US 2024/0264695 A1 Aug. 8, 2024

(30) Foreign Application Priority Data

Feb. 2, 2023 (KR) ........................ 10-2023-0014467

(51) Int. Cl.
  *G06F 3/041* (2006.01)
  *G06F 3/044* (2006.01)
(52) U.S. Cl.
  CPC ........ *G06F 3/04164* (2019.05); *G06F 3/0443* (2019.05); *G06F 3/0446* (2019.05); *G06F 2203/04112* (2013.01)

(58) Field of Classification Search
  CPC .. G06F 3/04164; G06F 3/0443; G06F 3/0446; G06F 2203/04112; G06F 3/0412; G06F 3/0448; G06F 3/0445
  See application file for complete search history.

(56) References Cited

U.S. PATENT DOCUMENTS

| | | | |
|---|---|---|---|
| 11,294,525 B2 | 4/2022 | Kida et al. | |
| 11,385,751 B2 | 7/2022 | Bang et al. | |
| 2014/0210736 A1* | 7/2014 | Jeon ...................... | G06F 3/0446 |
| | | | 345/173 |
| 2018/0224984 A1* | 8/2018 | Kim ...................... | G06F 3/0443 |
| 2022/0050555 A1 | 2/2022 | Maruyama et al. | |
| 2024/0264695 A1* | 8/2024 | Choi ...................... | G06F 3/0446 |

FOREIGN PATENT DOCUMENTS

| | | |
|---|---|---|
| JP | 2021-128511 A | 9/2021 |
| JP | 2022-033524 A | 3/2022 |
| KR | 10-2022-0001838 A | 1/2022 |

* cited by examiner

*Primary Examiner* — David D Davis

(74) *Attorney, Agent, or Firm* — Innovation Counsel LLP

(57) ABSTRACT

A touch sensor includes a sensor base layer; and a first sensing electrode and a second sensing electrode each disposed on the sensor base layer. A first sensing line, a second sensing line, and an auxiliary line are each disposed on the sensor base layer. The second sensing line includes a 2-1-th sensing line disposed in a sensing area and a 2-2-th sensing line disposed in a non-sensing area. The auxiliary line may overlap the second sensing electrode in a plan view, enclose at least a portion of the 2-1-th sensing line, and be electrically connected to the second sensing electrode.

20 Claims, 20 Drawing Sheets

PXL(SPX): SPX1 SPX2 SPX3

DD(TSP)

SP2
SP1

SW2-1

BS2

SA

NSA

SW1
SW2-2

CS

IA

PDA

TPD2

TPD1    TPD2

TPD1

COF

DR3
DR2
DR1

DCB(SDV)

RL: RL1, RL2
SP2: SP2-1, SP2-k, SP2-m, SP2-n
SW2-1: ESW1, ESWk, ESWm, ESWn

LD: EL, ELT1, ELT2

SW2-1

RL1
RL2

SP1 { C1
      BRD1

EA1

SP2 { C2
      BRD2

SA

C        C'

DR3
DR2
DR1

SP: SP1, SP2
BRD: BRD1, BRD2
C: C1, C2

SP: SP1, SP2
BRD: BRD1, BRD2
C: C1, C2
C1: C1-1, C1-2
C2: C2-1, C2-2

FIG. 11

BRD: BRD1, BRD2
C: C1, C2
C1: C1-1, C1-2
C2: C2-1, C2-2

FIG. 12

SPX: SPX1, SPX2, SPX3
SPXA: SPXA1, SPXA2, SPXA3
PXL: SPX1, SPX2, SPX3
EL: EL1, EL2, EL3

SP2(C2)
EP1
SW2-1
RL1
RL2
EP2
EP1
EP2

SP1 { C1
      BRD1

SP2 { C2
      BRD2

DR3
DR2
DR1

RL: RL1, RL2

RL: RL1, RL2
RL1: RL1-1, RL1-2
RL2: RL2-1, RL2-2

RL1: RL1-1 RL1-2
RL2: RL2-1 RL2-2

TOUCH SENSOR INCLUDING AUXILIARY LINE OVERLAPPING SENSOR ELECTRODE AND DISPLAY DEVICE INCLUDING THE SAME

CROSS-REFERENCE TO RELATED APPLICATION

This application claims priority to and benefits of Korean patent application No. 10-2023-0014467 under 35 U.S.C. § 119, filed on Feb. 2, 2023, in the Korean Intellectual Property Office, the entire contents of which are incorporated herein by reference.

BACKGROUND

1. Field of Invention

The present disclosure relates to a touch sensor and a display device including the touch sensor.

2. Description of Related Art

With the development of information technology, the importance of a display device, which is a connection medium between a user and information, has been emphasized. Owing to the importance of display devices, the use of various kinds of display devices, such as a liquid crystal display device and an organic light-emitting display device, has increased.

The display devices may include a display panel configured to display an image, and a sensing panel configured to sense an object. Here, the sensing panel may be used to determine a position of touch input provided from a user.

In the case where the user provides touch input to the sensing panel, there is variation in electrical signal around a periphery of the position to which the touch input is provided. If electrical signal distortion is caused, it may be difficult to precisely determine the position of the touch input.

SUMMARY

Various embodiments of the disclosure are directed to a touch sensor having high-quality touch performance resulting from improvement in reliability of touch input, and to a display device including the touch sensor.

An embodiment of a touch sensor having a sensing area and a non-sensing area may include a sensor base layer; and a first sensing electrode and a second sensing electrode each disposed on the sensor base layer in the sensing area. A first sensing line and a second sensing line may each be disposed on the sensor base layer. The first sensing line may be electrically connected to the first sensing electrode, and the second sensing line may be electrically connected to the second sensing electrode. The auxiliary line may be disposed on the sensor base layer. The second sensing line may include a 2-1-th sensing line disposed in the sensing area, and a 2-2-th sensing line disposed in the non-sensing area. The auxiliary line may overlap the second sensing electrode in a plan view, enclose at least a portion of the 2-1-th sensing line, and be electrically connected to the second sensing electrode.

In an embodiment, the non-sensing area may include a pad area in which touch sensing pads are disposed. The first sensing line and the 2-2-th sensing line may be disposed in an area between the pad area and the sensing area. The first sensing line and the 2-2-th sensing line may overlap the sensing area in the first direction, and may not overlap the sensing area in the second direction in the area between the sensing area and the pad area.

In an embodiment, the first sensing electrode may extend in a first direction, and the second sensing electrode may extend in a second direction different from the first direction.

In an embodiment, the first sensing electrode may include a transmitter pattern electrode.

The second sensing electrode may include a receiver pattern electrode. The number of transmitter columns formed of the first sensing electrode is less than the number of receiver rows formed of the second sensing electrode.

In an embodiment, the auxiliary line may extend in the same direction as the first sensing electrode, and include a first auxiliary line and a second auxiliary line. The first auxiliary line may be disposed on a first side of the 2-1-th sensing line, and the second auxiliary line may be disposed on a second side of the 2-1-th sensing line.

In an embodiment, the first sensing electrode may include a transmitter pattern electrode extending in a first direction and forming transmitter columns. The second sensing electrode may include a receiver pattern electrode extending in a second direction different from the first direction and forming receiver rows. The 2-1-th sensing line may extend in the first direction. The second sensing electrode may include a 2-k-th sensing electrode forming a k-th receiver row, and a 2-m-th sensing electrode forming an m-th receiver row. The 2-1-th sensing line may include a k-th extended sensing line electrically connected to the 2-k-th sensing electrode, and an m-th extended sensing line electrically connected to the 2-m-th sensing electrode, where k is a natural number less than m. The k-th extended sensing line may overlap the 2-m-th sensing electrode in a plan view.

In an embodiment, the auxiliary line may be electrically connected to the 2-m-th sensing electrode in an area in which the 2-m-th sensing electrode is disposed. The k-th extended sensing line may pass, in the first direction, through the area in which the 2-m-th sensing electrode is disposed.

In an embodiment, the first sensing electrode may include a first cell. The second sensing electrode may include a second cell. The auxiliary line and the 2-1-th sensing line may be formed of a first conductive pattern layer. The first cell and the second cell may be formed of a second conductive pattern layer. The first conductive pattern layer may be disposed between the sensor base layer and the second conductive pattern layer.

In an embodiment, the first sensing electrode may extend in a first direction. The auxiliary line may extend in the first direction, and include a plurality of auxiliary lines each including a first end and a second end. The first end may be disposed adjacent to a portion of an edge area of the second cell. The second end may be disposed adjacent to another portion of the edge area of the second cell.

In an embodiment, a plurality of auxiliary lines may not overlap the first sensing electrode in a plan view.

In an embodiment, the second cell may have a rhombus shape. The auxiliary line may include a first auxiliary line disposed on a first side of the 2-1-th sensing line, and a second auxiliary line disposed on a second side of the 2-1-th sensing line. The first auxiliary line may include a 1-1-th auxiliary line and a 1-2-th auxiliary line. The second auxiliary line may include a 2-1-th auxiliary line and a 2-2-th auxiliary line. The 1-2-th auxiliary line may be disposed between the 1-1-th auxiliary line and the 2-1-th sensing line. The 2-2-th auxiliary line may be disposed between the 2-1-th auxiliary line and the 2-1-th sensing line. A length of the 1-1-th auxiliary line may be less than a length of the 1-2-th auxiliary line. A length of the 2-1-th auxiliary line may be less than a length of the 2-2-th auxiliary line.

In an embodiment, the 2-1-th sensing line may extend in a first direction. The second cell may have a rhombus shape. The auxiliary line may include a first auxiliary line and a second auxiliary line each including a first end and a second end, the first auxiliary line being disposed on a first side of the 2-1-th sensing line, the second auxiliary line being disposed on a second side of the 2-1-th sensing line. The first auxiliary line may include a 1-1-th auxiliary line and a 1-2-th auxiliary line. The second auxiliary line may include a 2-1-th auxiliary line and a 2-2-th auxiliary line. The 1-2-th auxiliary line may be disposed between the 1-1-th auxiliary line and the 2-1-th sensing line. The 2-2-th auxiliary line may be disposed between the 2-1-th auxiliary line and the 2-1-th sensing line. The respective first ends of the 1-1-th auxiliary line, the 1-2-th auxiliary line, the 2-1-th auxiliary line, and the 2-2-th auxiliary line may be disposed along a first imaginary line extending in a second direction different from the first direction. The respective second ends of the 1-1-th auxiliary line, the 1-2-th auxiliary line, the 2-1-th auxiliary line, and the 2-2-th auxiliary line may be disposed along a second imaginary line extending in the second direction.

In an embodiment, the touch sensor may further include a dummy line formed of the first conductive pattern layer. The dummy line may extend in a direction identical to a direction in which the auxiliary line and the 2-1-th sensing line extend.

In an embodiment, the dummy line may overlap the second cell in a plan view.

In an embodiment, the dummy line may include a first end and a second end, and the first end and the second end of the dummy line may be disposed along an edge area of the second cell.

In an embodiment, the dummy line may not overlap the first sensing electrode in a plan view.

An embodiment of a touch sensor having a sensing area and a non-sensing area may include a sensor base layer, a transmitter pattern electrode, a receiver pattern, an auxiliary line, a first sensing line, and a second sensing line. The transmitter pattern electrode may be disposed on the sensor base layer and may include first cells and a first bridge electrically connecting the first cells to each other. The receiver pattern electrode may be disposed on the sensor base layer and may include second cells and a second bridge electrically connecting the second cells to each other. The auxiliary line may be disposed on the sensor base layer and may include a first end and a second end. The first sensing line may be electrically connected to the transmitter pattern electrode. The second sensing line may be electrically connected to the receiver pattern electrode. The auxiliary line may be formed of a first conductive pattern layer. The first cells and the second cells may be formed of a second conductive pattern layer. The first conductive pattern layer may be disposed between the sensor base layer and the second conductive pattern layer. The second sensing line may include a 2-1-th sensing line disposed in the sensing area, and a 2-2-th sensing line disposed in the non-sensing area. The auxiliary line may include a first auxiliary line disposed on a first side of the 2-1-th sensing line, and a second auxiliary line disposed on a second side of the 2-2-th sensing line. The first end and the second end of the auxiliary line may be disposed along an edge of each of the second cells.

In an embodiment, the non-sensing area may include a pad area in which touch sensing pads are disposed. The first sensing line and the 2-2-th sensing line may be disposed in an area between the pad area and the sensing area. The transmitter pattern electrode may extend in a first direction, and the receiver pattern electrode may extend in a second direction different from the first direction. The first sensing line and the 2-2-th sensing line may overlap the sensing area in the first direction, and may not overlap the sensing area in the second direction in the area between the sensing area and the pad area.

In an embodiment, the auxiliary line and the 2-1-th sensing line may be formed of a first conductive pattern layer. The first cells and the second cells may be formed of a second conductive pattern layer. The first conductive pattern layer may be disposed between the sensor base layer and the second conductive pattern layer.

An embodiment of a display device may include a display area, a sensing area, a non-sensing area, a display part, and a sensor part. The display part may include a light emitting element and a sensor part disposed on the display part. The sensor part may include a sensor base layer, a first sensing electrode, a second sensing electrode, a first sensing line, a second sensing line, and an auxiliary line. The first sensing electrode and the second sensing electrode may be disposed on the sensor base layer in the sensing area. The first sensing line and the second sensing line may each be disposed on the sensor base layer. The first sensing line being may be electrically connected to the first sensing electrode and the second sensing line may be electrically connected to the second sensing electrode. The auxiliary line may be disposed on the sensor base layer. The second sensing line may include a 2-1-th sensing line disposed in the sensing area, and a 2-2-th sensing line disposed in the non-sensing area. The auxiliary line may overlap the second sensing electrode in a plan view, and may enclose at least a portion of the 2-1-th sensing line.

BRIEF DESCRIPTION OF THE DRAWINGS

FIGS. 4 and 5 are schematic plan views illustrating a portion of a sensing area of a sensor part in accordance with an embodiment.

FIG. 11 illustrates a schematic cross-sectional structure taken along line A-A' of FIG. 10, and a cross-sectional structure taken along line B-B' of FIG. 10

FIG. 12 is a schematic sectional view illustrating a display device in accordance with an embodiment.

DETAILED DESCRIPTION

Figure 1:
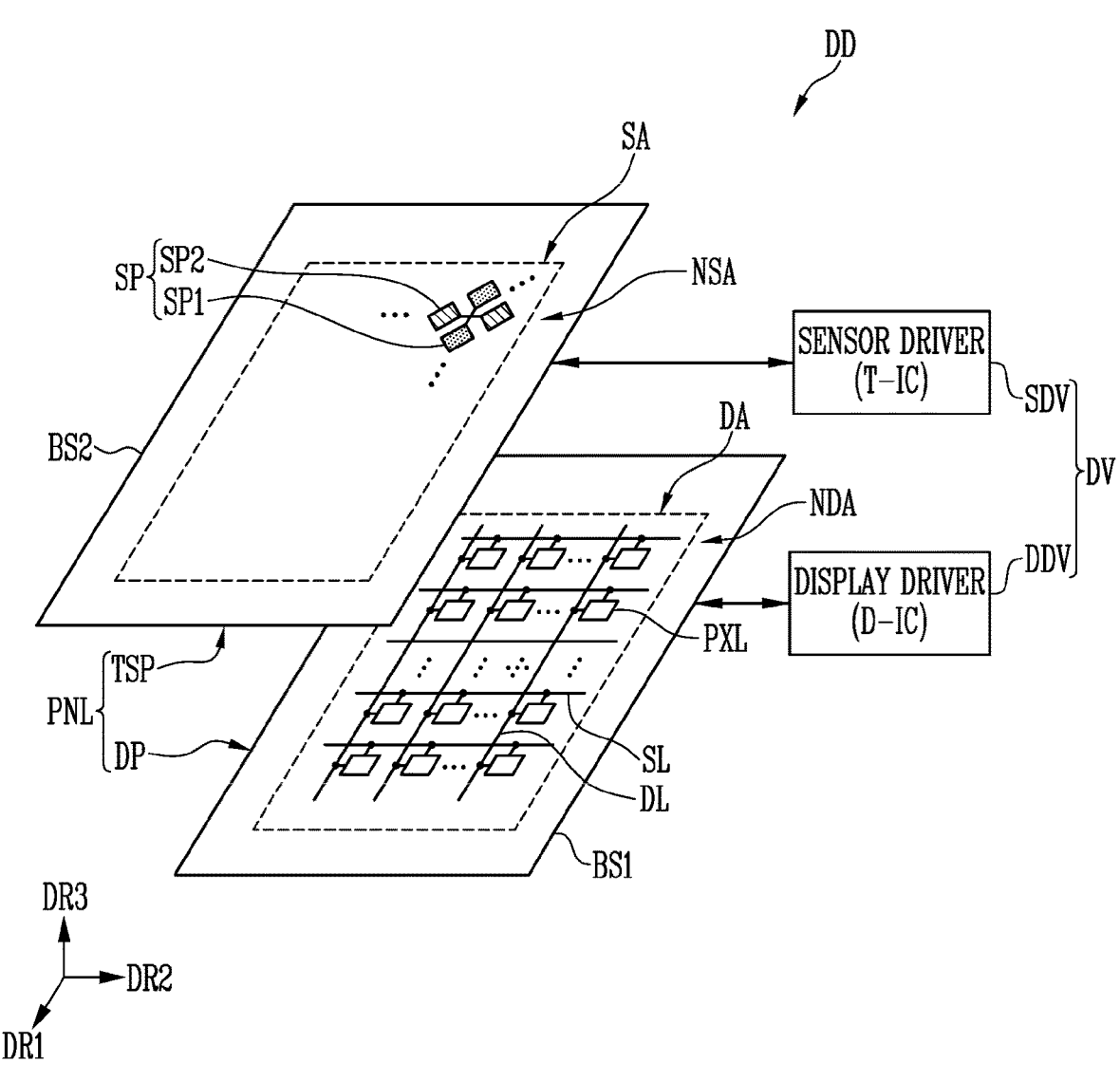
FIG. 1 is a schematic perspective view illustrating a display device in accordance with an embodiment.

As the disclosure allows for various changes and numerous embodiments, particular embodiments will be illustrated in the drawings and described in detail in the written description. However, this is not intended to limit the disclosure to particular modes of practice, and it is to be appreciated that all changes, equivalents, and substitutes that do not depart from the spirit and technical scope of the disclosure are encompassed in the disclosure.

It will be understood that, although the terms "first", "second", etc. may be used herein to describe various elements, these elements should not be limited by these terms. These terms are only used to distinguish one element from another element. For instance, a first element discussed below could be termed a second element without departing from the teachings of the disclosure. Similarly, the second element could also be termed the first element. In the disclosure, the singular forms are intended to include the plural forms as well, unless the context clearly indicates otherwise.

It will be further understood that the terms "comprise", "include", "have", etc. when used in the disclosure, specify the presence of stated features, integers, steps, operations, elements, components, and/or combinations of them but do not preclude the presence or addition of one or more other features, integers, steps, operations, elements, components, and/or combinations thereof. Furthermore, in case that a first part such as a layer, a film, a region, or a plate is disposed on a second part, the first part may be not only directly on the second part but a third part may intervene between them. In addition, when it is expressed that a first part such as a layer, a film, a region, or a plate is formed on a second part, the surface of the second part on which the first part is formed is not limited to an upper surface of the second part but may include other surfaces such as a side surface or a lower surface of the second part. To the contrary, in case that a first part such as a layer, a film, a region, or a plate is under a second part, the first part may be not only directly under the second part but a third part may intervene between them.

Various embodiments of the disclosure relate to a touch sensor and a display device including the touch sensor. Hereinafter, a touch sensor and a display device including the touch sensor in accordance with an embodiment will be described with reference to the accompanying drawings.

First, a display device DD including a display part DP and a sensor part TSP will be described with reference to FIGS. 1 to 3.

Figure 2:
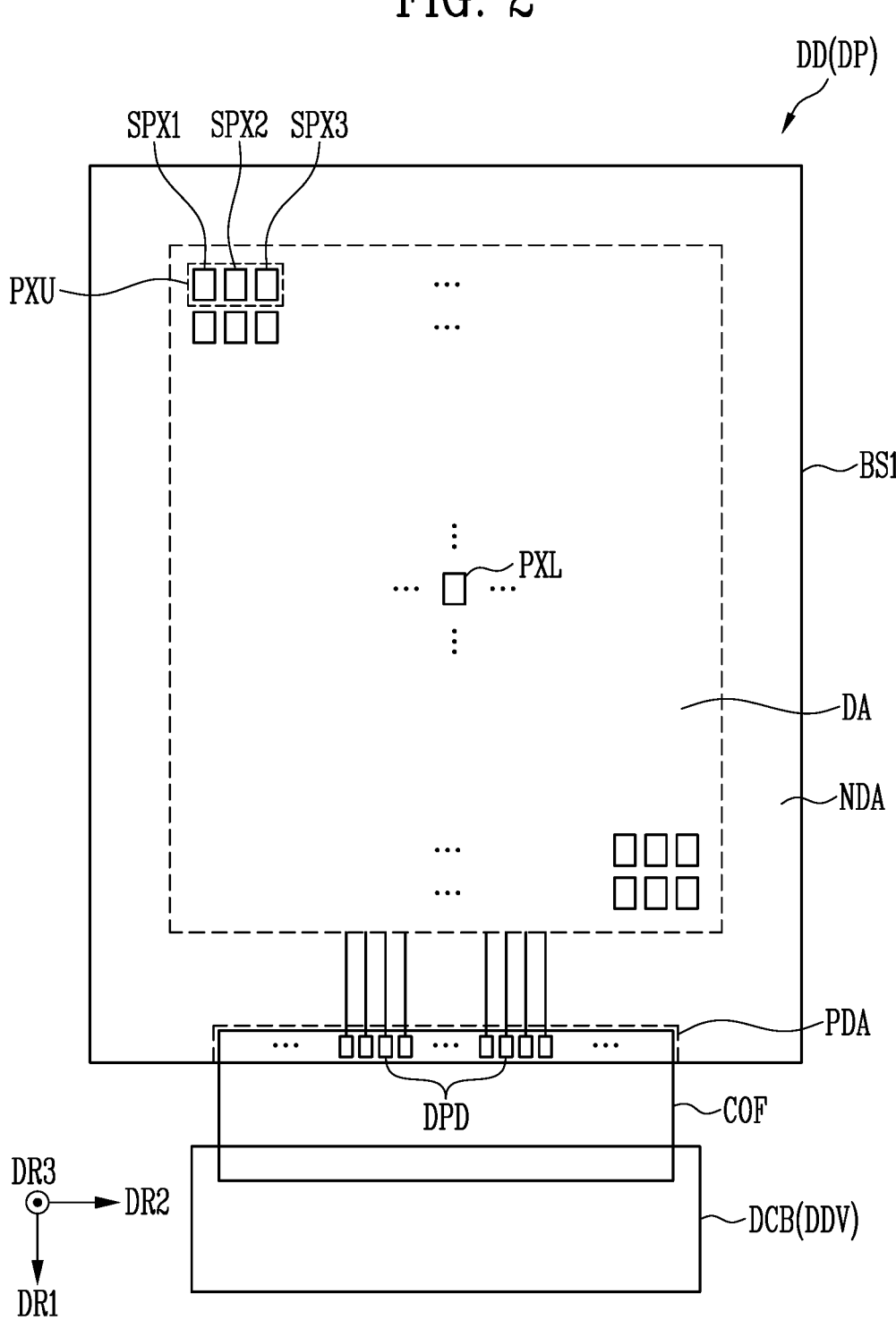
FIG. 2 is a schematic plan view illustrating a display device in accordance with an embodiment.

FIG. 1 is a schematic perspective view illustrating a display device DD in accordance with an embodiment. FIG. 2 is a schematic plan view illustrating a display device DD in accordance with an embodiment. For example, FIG. 2 illustrates a panel PNL, focused on the display part DP of the display device DD. FIG. 3 is a schematic plan view illustrating the display device DD in accordance with an embodiment. For example, FIG. 3 illustrates a panel PNL, focused on the sensor part TSP of the display device DD.

Figure 3:
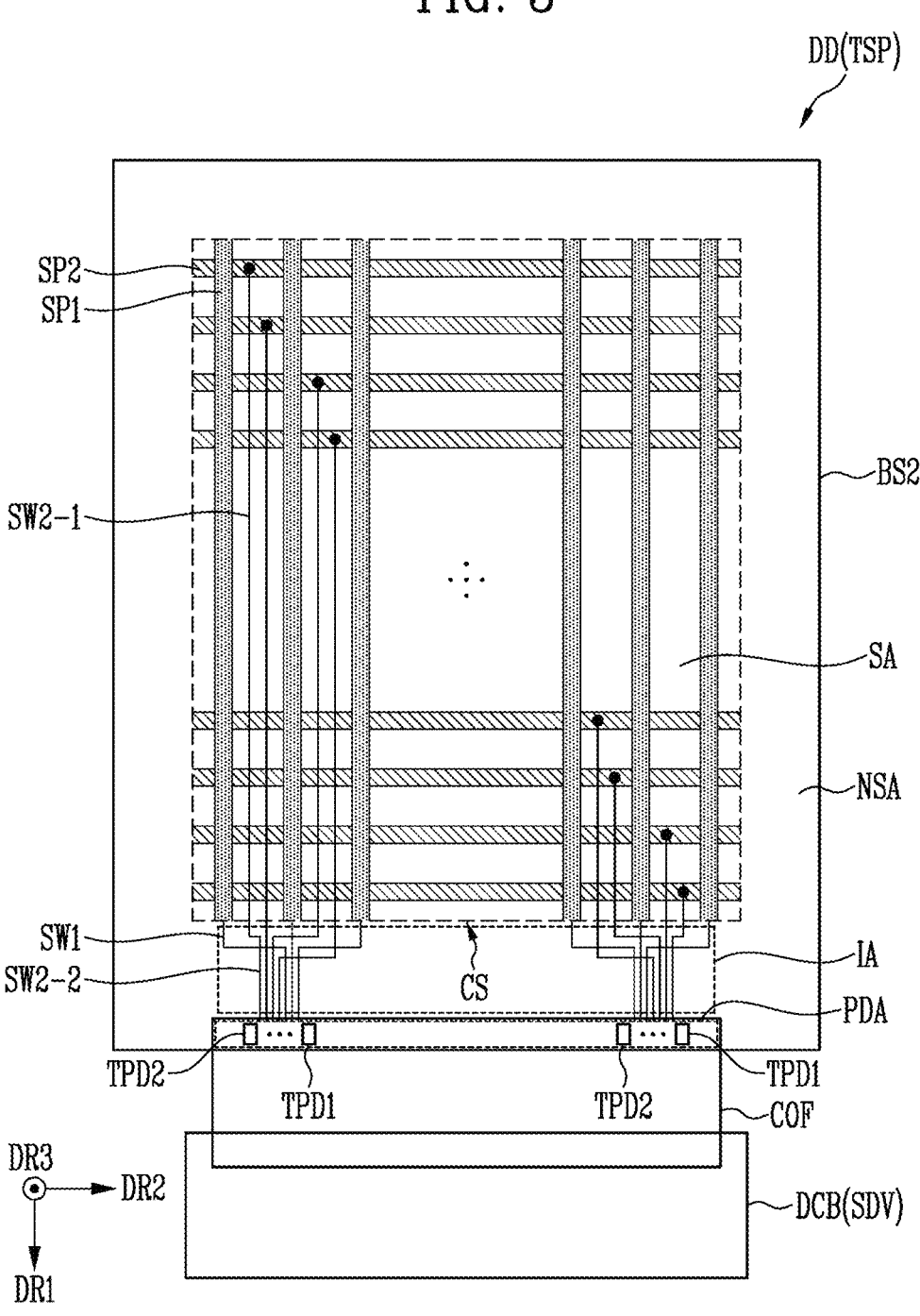
FIG. 3 is a schematic plan view illustrating a display device in accordance with an embodiment.

Referring to FIGS. 1 and 3, the display device DD may be configured to provide (or emit) light. The display device DD may include a panel PNL, and a driving circuit component DV configured to drive the panel PNL.

The panel PNL may include a display part DP configured to display an image, and a sensor part TSP configured to sense user input (e.g., touch input). The display part DP may be referred to as a display panel. The sensor part TSP may be referred to as a sensing panel or a touch sensor.

The panel PNL may include pixels PXL and sensing electrodes SP. The driving circuit component DV may include a display driver DDV configured to drive the display part DP, and a sensor driver SDV configured to drive the sensor part TSP.

The pixels PXL may display an image during each display frame period. The sensing electrodes SP may sense input (e.g., touch input) from the user during each sensing frame period. The sensing frame period and the display frame period may be independent from each other, or may be different from each other. The sensing frame period and the display frame period may be synchronized with each other, or may not be synchronized.

The sensor part TSP including the sensing electrodes SP may obtain information about the touch input from the user. In an embodiment (e.g., using a mutual capacitance scheme), the sensing electrodes SP may include a first sensing electrode SP1 configured to provide a first sensing signal, and a second sensing electrode SP2 configured to provide a second sensing signal.

In an embodiment, the first sensing electrode SP1 may be a transmitter (Tx) pattern electrode, and the second sensing electrode SP2 may be a receiver (Rx) pattern electrode. Information about the touch input (or a touch event) may mean information including a position or the like of a touch provided from the user.

In an embodiment (e.g., using a mutual capacitance scheme), the sensing electrodes SP may be configured of one kind of sensing electrodes without being classified into the first sensing electrode SP1 and the second sensing electrode SP2.

The display part DP may include a first base layer BS1, and pixels PXL disposed on the first base layer BS1. The pixels PX may be disposed in a display area DA. The first base layer BS1 may be a display base layer.

The first base layer BS1 (or the display device DD) may include the display area DA formed to display an image, and a non-display area NDA which is an area other than the display area DA. In an embodiment, the display area DA may be disposed in a central portion of the display part DP, and the non-display area NDA may be disposed adjacent to a periphery of the display area DA.

The first base layer BS1 may be a base substrate or a base component for supporting the display device DD. The base layer may be a rigid substrate made of glass. Alternatively, the base layer may be a flexible substrate which can be bent, folded, or rolled. In this case, the base layer may include insulating material such as polymer resin, e.g., polyimide. However, the disclosure is not particularly limited to the foregoing.

Scan lines SL, data lines DL, and pixels PXL which are electrically connected to the scan lines SL and the data lines DL may be disposed in the display area DA.

The pixels PXL may be supplied with data signals from the data lines DL based on turn-on level scan signals supplied from the scan lines SL, and may emit light having luminance corresponding to the data signals. Consequently, an image corresponding to the data signals may be displayed in the display area DA.

The pixels PXL may be arranged in the display area DA according to an arrangement structure. For example, the pixels PXL may be arranged according to a stripe or PENTILE™ arrangement structure. However, the disclosure is not limited to the foregoing example.

The pixel PXL (or a sub-pixel SPX) may include a first sub-pixel SPX1, a second sub-pixel SPX2, and a third sub-pixel SPX3. At least one first sub-pixel SPX1, at least one second sub-pixel SPX2, and at least one third sub-pixel SPX3 may form one pixel unit PXU which may emit various colors of light.

For example, each of the first sub-pixel SPX1, the second sub-pixel SPX2, and the third sub-pixel SPX3 may emit a color of light. For instance, the first sub-pixel SPX1 may be a red pixel configured to emit red (e.g., first color) light, the second sub-pixel SPX2 may be a green pixel configured to emit green (e.g., second color) light, and the third sub-pixel SPX3 may be a blue pixel configured to emit blue (e.g., third color) light.

Various lines and/or internal circuits which are connected to the pixels PXL of the display area DA may be disposed in the non-display area NDA. For example, a plurality of lines for supplying various power voltages and control signals to the display area DA may be disposed in the non-display area NDA. For example, sensing lines SW for electrically connecting the sensing electrodes SP and the sensor driver SDV to each other may be disposed in the non-display area NDA.

The panel PNL may include a pad area PDA. The panel PNL may include display pads DPD, a chip-on-film COF, and a driving circuit board DCB.

The display pads DPD may be disposed in the pad area PDA. The pad area PDA may be disposed in the non-display area NDA. The non-display area NDA may include the pad area PDA. For example, the pad area PDA may be disposed on a side of the display area DA.

The display pads DPD may be electrically connected to the pixels PXL in the display area DA through lines. The display pads DPD may be electrically connected, through the chip-on-film COF, to the display driver DDV formed in the driving circuit board DCB. For example, an electrical signal provided from the display driver DDV may be applied to the pixel PXL through the display pads DPD.

The chip-on-film COF may be electrically connected to the display pads DPD and the display driver DDV. For example, one end of the chip-on-film COF may be connected (or attached) to the pad area PDA, and another end of the chip-on-film COF may be connected (or attached) to the driving circuit board DCB. At least a portion of the chip-on-film COF may be bent.

The chip-on-film COF may include an insulating film and a plurality of lines provided on the insulating film. The chip-on-film COF may be a collective name for a structure including an insulting film formed of a thin film, and lines formed on the insulating film, and may also be referred to as a tape carrier package, a flexible printed circuit board, or the like. In the chip-on-film COF, although not illustrated, a semiconductor chip connected to at least some of the lines may be further mounted on the insulating film.

The driving circuit board DCB may include a flexible circuit substrate. The display driver DDV may be formed in the driving circuit board DCB. The driving circuit board DCB may be disposed on a rear surface of the first base layer BS1 of the display part DP. One end of the flexible circuit component FPCB may be connected to the chip-on-film COF having a bent shape and may be disposed on the rear surface of the first base layer BS1, so that the driving circuit board DCB can be prevented from being visible to the outside.

The sensor part TSP in accordance with an embodiment will be described with reference to FIGS. 4 and 5 as well as FIGS. 1 to 3.

Figure 4:
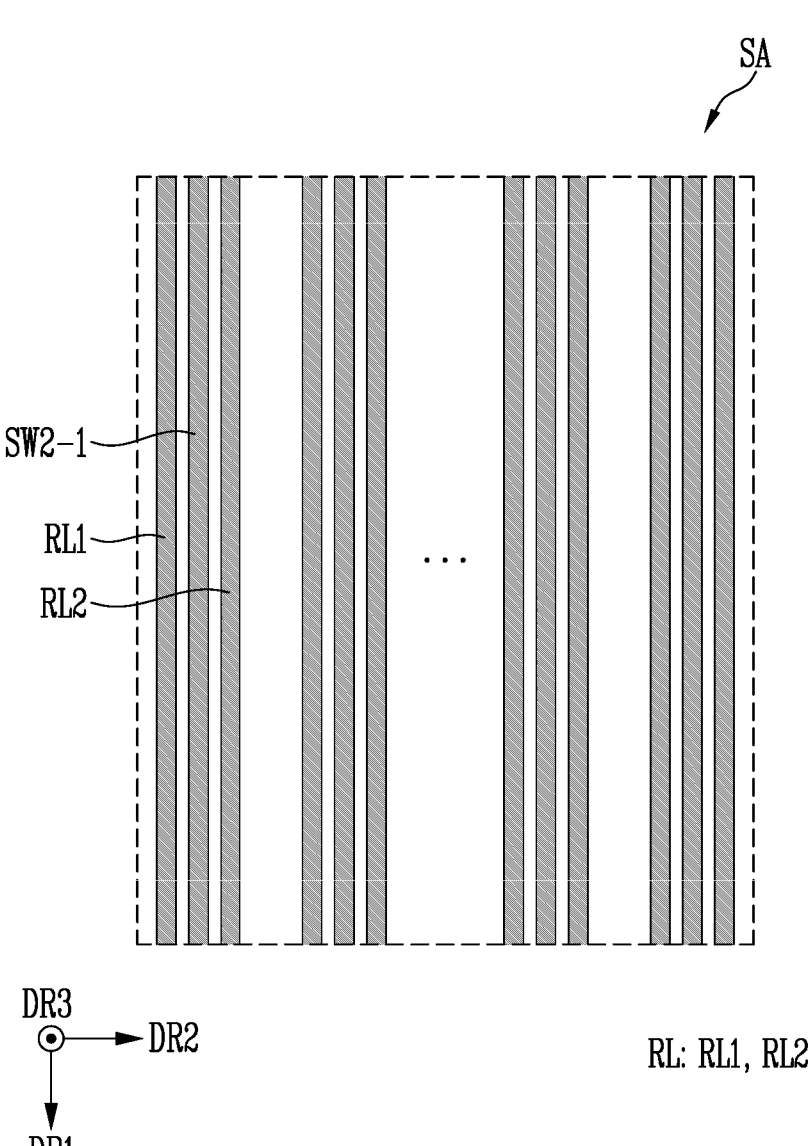
Figure 5:
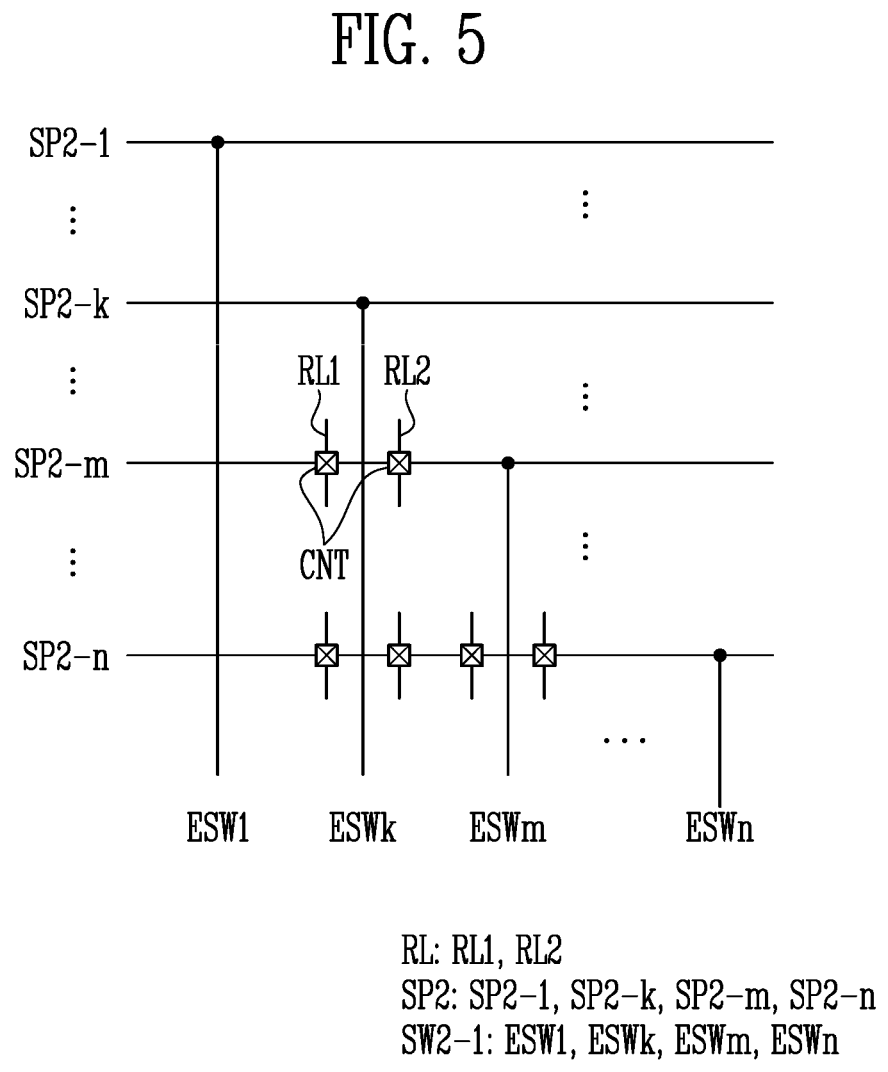

FIGS. 4 and 5 are schematic plan views illustrating a portion of a sensing area SA of the sensor part TSP in accordance with an embodiment. FIG. 4 illustrates a 2-1-th sensing line SW2-1 and an auxiliary line RL in accordance with an embodiment. FIG. 5 is a schematic view illustrating a connection relationship between the second sensing electrodes SP2, the 2-1-th sensing line SW2-1, and the auxiliary line RL.

The sensor part TSP may include a second base layer BS2, and a plurality of sensing electrodes SP disposed on the second base layer BS2. The sensing electrodes SP may be disposed in the sensing area SA on the second base layer BS2. The second base layer BS2 may be a sensor base layer.

The sensor part TSP may obtain information about input provided from the user. The sensor part TSP may be configured to recognize touch input.

The second base layer BS2 (or the display device DD) may include the sensing area SA capable of sensing touch input or the like, and a non-sensing area NSA formed around a periphery of the sensing area SA. In an embodiment, the sensing area SA may be disposed to overlap at least one area of the display area DA. For example, the sensing area SA may be set to an area corresponding to the display area DA (e.g., an area overlapping the display area DA). The non-sensing area NSA may be set to an area corresponding to the non-display area NDA (e.g., an area overlapping the non-display area NDA). In this case, when touch input or the like is provided on the display area DA, the sensor part TSP may detect the touch input.

The second base layer BS2 may include one or more insulating layers {e.g., a first insulating layer INS1 (refer to FIG. 8)}. For example, the first insulating layer INS1 provided to form the second base layer BS2 may be disposed on the display part DP, thus forming a base on which the sensing electrodes SP are to be formed. However, an example pertaining to forming the second base layer BS2 is not particularly limited.

The sensing area SA may be set to an area (i.e., an active area of the sensor) capable of responding to touch input. To this end, the sensor electrodes SP for sensing the touch input or the like may be disposed in the sensing area SA.

In an embodiment, each of the first sensing electrodes SP1 may extend in a first direction DR1. The first sensing electrodes SP1 may be arranged adjacently in the second direction DR2. Each of the first sensing electrodes SP1 may extend in the first direction DR1 in the sensing area SA, and may form a corresponding Tx column.

In an embodiment, each of the second sensing electrodes SP2 may extend in a second direction DR2. The second sensing electrodes SP2 may be arranged adjacently in the first direction DR1. Each of the second sensing electrodes SP2 may extend in the second direction DR2 in the sensing area SA, and may form a corresponding Rx row.

The second direction DR2 may differ from the first direction DR1. For example, the second direction DR2 may be a direction perpendicular to the first direction DR1.

FIG. 3 schematically illustrates a structure in which each of the first sensing electrodes SP1 and the second sensing electrodes SP2 extends in one direction, for convenience of explanation. FIG. 3 illustrates that the first sensing electrodes SP1 can generally extend in the first direction DR1, and illustrates that the first sensing electrodes SP1 form electrical paths (e.g., Tx columns) extending in the first direction DR1. FIG. 3 illustrates that the second sensing electrodes SP2 can generally extend in the second direction DR2, and illustrates that the second sensing electrodes SP2 form electrical paths (e.g., Rx rows) extending in the second direction DR2.

In an embodiment, the first sensing electrodes SP1 and the second sensing electrodes SP2 may have substantially the same shape. For example, the first sensing electrodes SP1, which are Tx pattern electrodes, and the second sensing electrodes SP2, which area Rx pattern electrodes, may have substantially the same shape, so that the performance of sensing a touch event in the sensing area SA can be set to be uniform.

The panel PNL may include the sensing lines SW, first touch sensing pads TPD1, and second touch sensing pads TPD2. The sensing lines SW may include first sensing lines SW1 and second sensing lines SW2.

In the sensing area SA and the non-sensing area NSA of the sensor part TSP, the sensing lines SW may be disposed to electrically connect the sensing electrodes SP with the sensor driver SDV or the like.

The first sensing line SW1 may be electrically connected to the first sensing electrode SP1. The first sensing line SW1 may be a first tracing line for the first sensing electrode SP1.

The first sensing line SW1 may be disposed in the non-sensing area NSA. In an embodiment, the non-sensing area NSA may include the pad area PDA. The first sensing line SW1 may be disposed in an area IA between the pad area PDA and the display area DA, and may electrically connect the corresponding first sensing electrode SP1 and the corresponding first touch sensing pad TPD1 to each other on a side CS of the display area DA.

For example, the first sensing electrode SP1 may include 1-1-th sensing electrode and a 1-2-th sensing electrode. The first sensing line SW1 may include a 1-1-th sensing line and a 1-2-th sensing line. The first touch sensing pad TPD1 may include a 1-1-th sensing pad and a 1-2-th sensing pad. Here, the 1-1-th sensing line may electrically connect the 1-1-th sensing electrode to the 1-1-th sensing pad. The 1-2-th sensing line may electrically connect the 1-2-th sensing electrode to the 1-2-th sensing pad.

The first sensing lines SW1 and the first sensing electrodes SP1 may be electrically connected to each other on the side CS of the sensing area SA. In an embodiment, the side CS of the sensing area SA may be the shortest side. Because the first sensing electrodes SP1 are electrically connected to the first sensing lines SW1 at positions corresponding to the shortest side of the sensing area SA, the number of Tx columns may be relatively reduced. For example, the number of Tx columns formed by the first sensing electrodes SP1 may be less than the number of Rx rows formed by the second sensing electrodes SP2.

The pad area PDA may be disposed on a side of the sensing area SA. The pad area PDA may be disposed in the non-sensing area NSA.

The pad area PDA may overlap the sensing area SA in a direction (e.g., the first direction DR1) in which the first sensing electrode SP1 and the 2-1-th sensing line SW2-1 extend. The pad area PDA may overlap the first sensing line SW1 and the second sensing line SW2 in the direction (e.g., the first direction DR1) in which the first sensing electrode SP1 and the 2-1-th sensing line SW2-1 extend. The first sensing line SW1 and the 2-2-th sensing line SW2-2 may be disposed in the area IA between the pad area PDA and the sensing area SA.

The first sensing line SW1 and the 2-2-th sensing line SW2-2 may overlap the sensing area SA and the pad area PDA in the direction (e.g., the first direction DR1) in which the first sensing electrode SP1 and the 2-1-th sensing line SW2-1 extend. The first sensing line SW1 and the 2-2-th sensing line SW2-2 may not overlap the sensing area SA in the area IA between the sensing area SA and the pad area PDA in a direction (e.g., the second direction DR2) in which the second sensing electrode SP2 extends.

The second sensing line SW2 may be electrically connected to the second sensing electrode SP2. The second sensing line SW2 may be a second tracing line for the second sensing electrode SP2.

The second sensing line SW2 may overlap the sensing area SA in a plan view. The second sensing line SW2 may include a 2-1-th sensing line SW2-1 disposed in the sensing area SA, and a 2-2-th sensing line SW2-2 disposed in the non-sensing area NSA.

The 2-1-th sensing line SW2-1 may extend in the first direction DR1 in the sensing area SA. The 2-1-th sensing line SW2-1 may be electrically connected to the corresponding second sensing electrode SP2. In an embodiment, the 2-1-th sensing line SW2-1 may include sensing lines corresponding to the respective second sensing electrodes SP2.

The 2-1-th sensing line SW2-1 may overlap two or more second sensing electrodes SP2. For example, one of the 2-1-th sensing lines SW2-1 may overlap, in the first direction DR1, the second sensing electrodes SP2 disposed on different Rx rows.

For example, the second sensing electrodes SP2 may include n second sensing electrodes SP2. An n-th second sensing electrode SP2 may be referred to as a 2-n-th sensing electrode SP2-$n$. For example, the second sensing electrodes SP2 may include a 2-1-th sensing electrode SP2-1 which forms a first Rx row, a 2-k-th sensing electrode SP2-$k$ which forms a k-th Rx row, and a 2-m-th sensing electrode SP2-$m$ which forms an m-th Rx row. Here, m and k are natural numbers, and k is a natural number less than m.

The 2-1-th sensing line SW2-1 may include n extended sensing lines. For example, the 2-1-th sensing line SW2-1 may include a first extended sensing line ESW1 electrically connected to the 2-1-th sensing electrode SP2-1, a k-th extended sensing line ESWk electrically connected to the 2-k-th sensing electrode SP2-$k$, and an m-th extended sensing line ESWm electrically connected to the 2-m-th sensing electrode SP2-$m$.

The 2-2-th sensing line SW2-2 may be electrically connected to the 2-1-th sensing line SW2-1. For example, the number of 2-2-th sensing lines SW2-2 may correspond to the number of 2-1-th sensing lines SW2-1, and each 2-2-th sensing line SW2-2 may be electrically connected to the corresponding 2-1-th sensing line SW2-1.

In an embodiment, the 2-1-th sensing line SW2-1 may extend in the sensing area SA, and may be electrically connected to the 2-2-th sensing line SW2-2 disposed adjacent to the touch sensing pads TPD1 and TPD2. In this case, the second sensing line SW2 may not enclose remaining sides of the sensing area SA other than the side CS. Experimentally, in the case where the second sensing line SW2 encloses the remaining sides of the sensing area SA other than the side CS, the surface area of the non-sensing area NSA is required to be increased. As a result, there is a concern about an increase in dead space in the display device DD.

However, in an embodiment, the area in which the second sensing lines SW2 are disposed around the periphery of the sensing area SA may be minimized. For example, because the second sensing lines SW2 are selectively disposed in the sensing area SA and only the area IA adjacent to the side CS of the sensing area SA, the dead space may be reduced.

Furthermore, because the area adjacent to the side CS may be an area in which the first sensing lines SW1 are disposed, the effect of reducing the dead space may be further maximized.

The sensor part TSP may further include an auxiliary line RL. The auxiliary line RL may include a first auxiliary line RL1 and a second auxiliary line RL2. The auxiliary line RL may be disposed in the sensing area SA, and may be supplied with a sensing signal. For example, the auxiliary line RL may be supplied with a sensing signal (e.g., an Rx signal) to be applied to the second sensing electrode SP2. In another example, the auxiliary line RL may be electrically connected to a ground line and thus supplied with a ground signal.

The first auxiliary line RL1 and the second auxiliary line RL2 may be adjacent to each other in a direction (e.g., the second direction DR2) in which the 2-1-th sensing lines SW2-1 are adjacent to each other.

The first auxiliary line RL1 and the second auxiliary line RL2 may extend in a direction (e.g., the second direction DR2) in which the 2-1-th sensing line SW2-1 extends.

The auxiliary line RL may enclose at least a portion of the 2-1-th sensing line SW2-1. For example, the first auxiliary line RL1 may be disposed on a first side of the 2-1-th sensing line SW2-1, and the second auxiliary line RL2 may be disposed on a second side of the 2-2-th sensing line SW2-2.

In an embodiment, the auxiliary line RL may prevent the 2-1-th sensing line SW2-1 and the first sensing electrode SP1 from forming a capacitance therebetween. For example, the auxiliary line RL may form a capacitance with the first sensing electrode SP1. Furthermore, the auxiliary line RL may block space between the 2-1-th sensing line SW2-1 and the first sensing electrode SP1 so that a capacitance can be prevented from being formed between the 2-1-th sensing line SW2-1 and the first sensing electrode SP1.

In an embodiment, the k-th extended sensing line ESWk may include information about a touch event corresponding to a k-th Rx column. The m-th extended sensing line ESWm may include information about a touch event corresponding to the m-th Rx column. Here, due to the structure of the 2-1-th sensing line SW2-1 (e.g., a structure in which the k-th extended sensing line ESWk intersects the 2-m-th sensing electrode SP2-$m$), not only an electrical signal to be applied to the 2-mth sensing electrode SP2-$m$ but also an electrical signal to be applied to the 2-k sensing electrode SP2-$k$ corresponding to the k-th Rx column (where k is less than m) may pass through a position corresponding to the m-th Rx column.

According to the conventional structure, when the user provides touch input, a ghost touch phenomenon in which touch input is recognized at an incorrect position not a position intended by the user may have occurred. For example, even in the case where touch input is provided adjacent to the area in which the 2-m-th sensing electrode SP2-$m$ is disposed, the capacitance formed by the first sensing electrode SP1 and the k-th extended sensing line ESWK to which an electrical signal pertaining to the 2-k-th sensing electrode SP2-$k$ is applied may be changed. In this case, the touch input may be recognized in the area where the 2-k-th sensing electrode SP2-$k$ is disposed.

However, according to an embodiment, the auxiliary line RL may prevent a capacitance from being formed between the 2-1-th sensing line SW2-1 and the first sensing electrode SP1, so that a risk of recognition of the touch input at a position unintended by the user can be prevented.

In other words, in an embodiment, a reduction in dead space may be realized, and a risk of malfunction pertaining to the touch event from the user may be prevented from occurring, so that a high quality touch sensor can be provided.

The first touch sensing pads TPD1 and the second touch sensing pads TPD2 may be disposed in the pad area PDA.

The first touch sensing pads TPD1 may be electrically connected to the first sensing patterns SP1 in the sensing area SA through the first sensing lines SW1. The second touch sensing pads TPD2 may be electrically connected to the second sensing patterns SP2 in the sensing area SA through the second sensing lines SW2.

The first touch sensing pads TPD1 and the second touch sensing pads TPD2 may be electrically connected, through the chip-on-film COF, to the sensor driver SDV formed on the driving circuit board DCB.

For example, an electrical signal provided from the sensor driver SDV may be applied to the sensing electrodes SP through the first touch sensing pads TPD1 and the second touch sensing pads TPD2. In an embodiment, the first touch sensing pads TPD1 may be Tx pads, and the second touch sensing pads TPD2 may be Rx pads.

Figure 6:
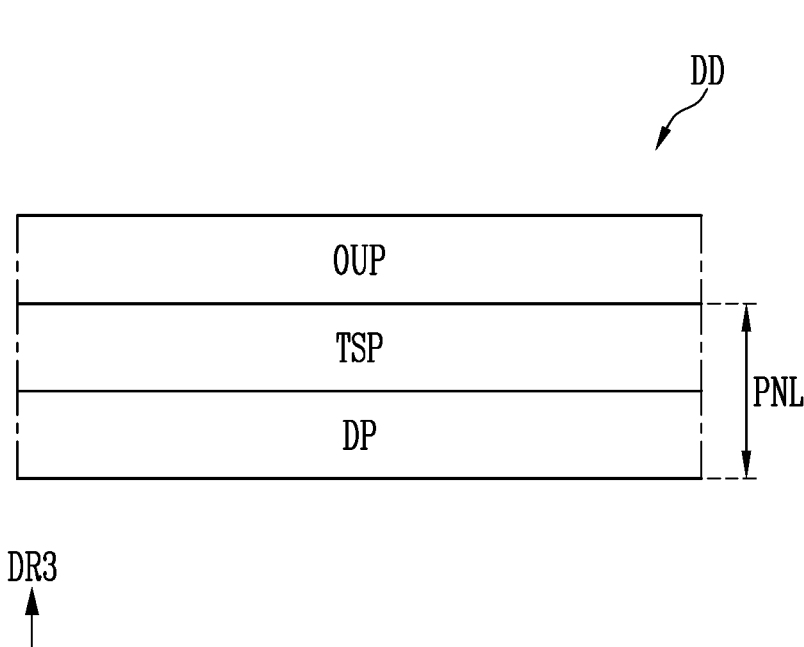
FIG. 6 is a schematic sectional view for describing a stacked structure of a display device in accordance with an embodiment.

Next, a cross-sectional structure of the display device DD in accordance with an embodiment will be described with reference to FIG. 6. FIG. 6 is a schematic sectional view for describing a stacked structure of the display device DD in accordance with an embodiment.

Referring to FIG. 6, the sensor part TSP may be disposed on the display part DP. The display device DD may include an outer part OUP.

The outer part OUP may be disposed substantially on the display device DD based on a thickness direction (e.g., a third direction DR3) of the first base layer BS1. The outer part OUP may be disposed on the sensor part TSP. Light provided from the display device DP may be emitted to the outside through the outer part OUP. In an embodiment, the outer part OUP may include a window. In an embodiment, the outer part OUP may include a reflection control layer RCL (refer to FIG. 12), and a light blocking layer LBL (refer to FIG. 12). In an embodiment, the outer part OUP may further include color filters.

Figure 7:
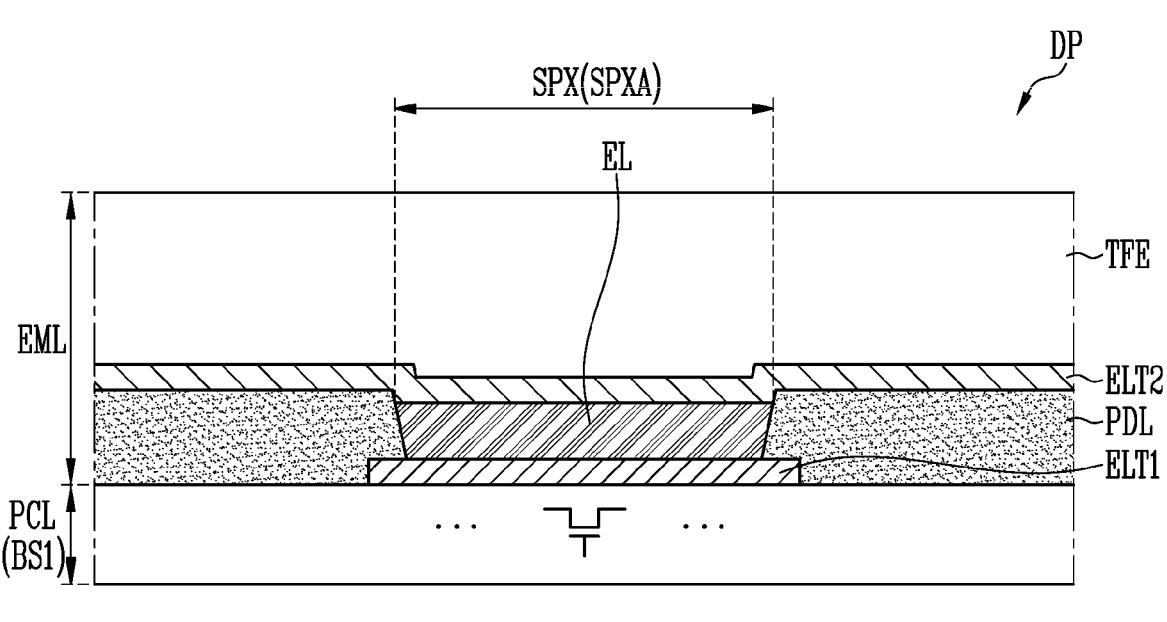
FIG. 7 is a schematic sectional view illustrating a display part in accordance with an embodiment.
Figure 7:
Figure 7:

Next, an embodiment of the display part DP will be described with reference to FIG. 7. FIG. 7 is a schematic sectional view illustrating the display part DP in accordance with an embodiment.

Referring to FIG. 7, the display part DP may include a pixel circuit layer PCL, and a light-emitting-element layer EML.

In an embodiment, the display part DP may output visible information (e.g., an image). In an embodiment, the type/kind of the display part DP is not particularly limited. For example, the display part DP may be implemented as a self-emissive-type display panel such as an organic light emitting display panel. However, in the case in which the display part DP is implemented as a self-emissive type, each pixel is not limited to the case where the pixel includes only an organic light emitting element. For example, the light emitting element of each pixel may be formed of an organic light emitting diode, an inorganic light emitting diode, a quantum dot/well light emitting diode, or the like. In an embodiment, the display part DP may be implemented as a non-emission type display panel such as a liquid crystal display panel. In the case in which the display part DP is implemented as a non-emission type, the display device DD may further include a light source such as a back-light unit.

Hereinafter, for convenience of explanation, description will be made based on an embodiment in which the display part DP is implemented as an organic light emitting display panel.

The pixel circuit layer PCL may include a pixel circuit configured to drive light emitting elements LD. The pixel circuit layer PCL may include a first base layer BS1, conductive layers formed to form pixel circuits, and insulating layers disposed between the conductive layers.

Each of the pixel circuits may include a thin film transistor. The pixel circuit may include a driving transistor. The pixel circuit may be electrically connected to the light emitting elements LD, and may provide electrical signals allowing the light emitting elements LD to emit light.

The light-emitting-element layer EML may be disposed on the pixel circuit layer PCL. In an embodiment, the light-emitting-element layer EML may include a light emitting element LD, a pixel defining layer PDL, and an encapsulation layer TFE.

The light emitting element LD may be disposed on the pixel circuit layer PCL. In an embodiment, the light emitting element LD may include a first electrode ELT1, an emission layer EL, and a second electrode ELT2. In an embodiment, the emission layer EL may be disposed in an area defined by the pixel defining layer PDL. The pixel defining layer PDL may be adjacent to a periphery of the emission layer EL. One surface of the emission layer EL may be electrically connected to the first electrode ELT1. The other surface of the emission layer EL may be electrically connected to the second electrode ELT2.

The first electrode ELT1 may be an anode electrode for the emission layer EL. The second electrode ELT2 may be a common electrode (or a cathode electrode) for the emission layer EL. In an embodiment, the first electrode ELT1 and the second electrode ELT2 may include conductive material. For example, the first electrode ELT1 may include conductive material having reflectibility. The second electrode ELT2 may include transparent conductive material. However, the disclosure is not limited thereto.

The emission layer EL may have a multilayer thin-film structure including a light generation layer. The emission layer EL may include: a hole injection layer into which holes are injected; a hole transport layer which has excellent hole transportation performance and restrains movement of electrons that have not been coupled with holes in the light generation layer and thus increases chances of recombination between holes and electrons; the light generation layer which emits light by recombination between injected electrons and holes; a hole blocking layer which restrains movement of holes that have not been coupled with electrons in the light generation layer; an electron transport layer which is provided to smoothly transport electrons to the light generation layer; and an electron injection layer into which electrons are injected. The emission layer EL may emit light based on an electrical signal which is provided from the first electrode ELT1 and the second electrode ELT2.

The emission layer EL may form a sub-pixel SPX. The emission layer EL may form a sub-pixel area SPXA configured to emit a color of light. In a plan view, an area of the emission layer EL and the sub-pixel area SPXA may correspond to each other. For example, each emission layer EL may correspond to an associated sub-pixel area SPXA.

The pixel defining layer PDL may be disposed on the pixel circuit layer PCL, and may define a position at which the emission layer EL is to be disposed. The pixel defining layer PDL may include organic material. In an embodiment, the pixel defining layer PDL may be formed of one or more selected from the group consisting of acryl resin, epoxy resin, phenol resin, polyamide resin, and polyimide resin. However, the disclosure is not limited thereto.

The encapsulation layer TFE may be disposed on the second electrode ELT2. The encapsulation layer TFE may offset a step difference formed by the light emitting element LD and the pixel defining layer PDL. The encapsulation layer TFE may include a plurality of insulating layers configured to cover the light emitting element LD. In an embodiment, the encapsulation layer TFE may have a structure formed by alternately stacking inorganic layers and organic layers. In an embodiment, the encapsulation layer TFE may be formed of a thin film encapsulation layer.

Next, an embodiment of the sensor part TSP will be described with reference to FIGS. 8 to 11.

Figure 8:
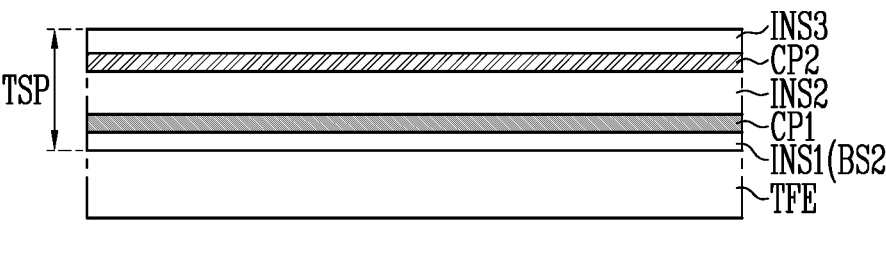
FIG. 8 is a schematic sectional view illustrating a sensor part in accordance with an embodiment.
Figure 8:
Figure 9:
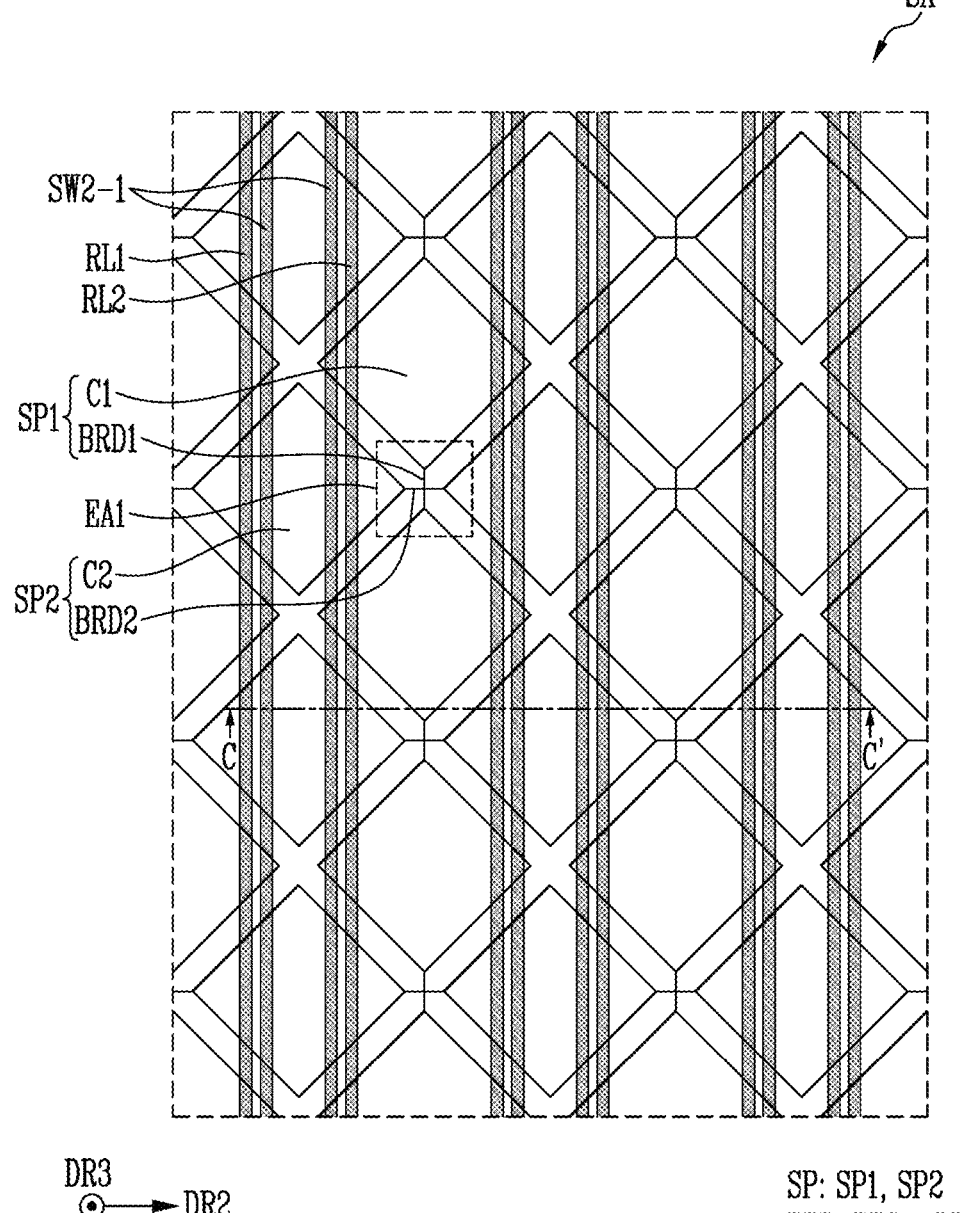
FIG. 9 is a schematic plan view illustrating a sensing area in accordance with an embodiment.
Figure 9:
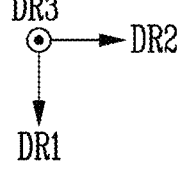
Figure 10:
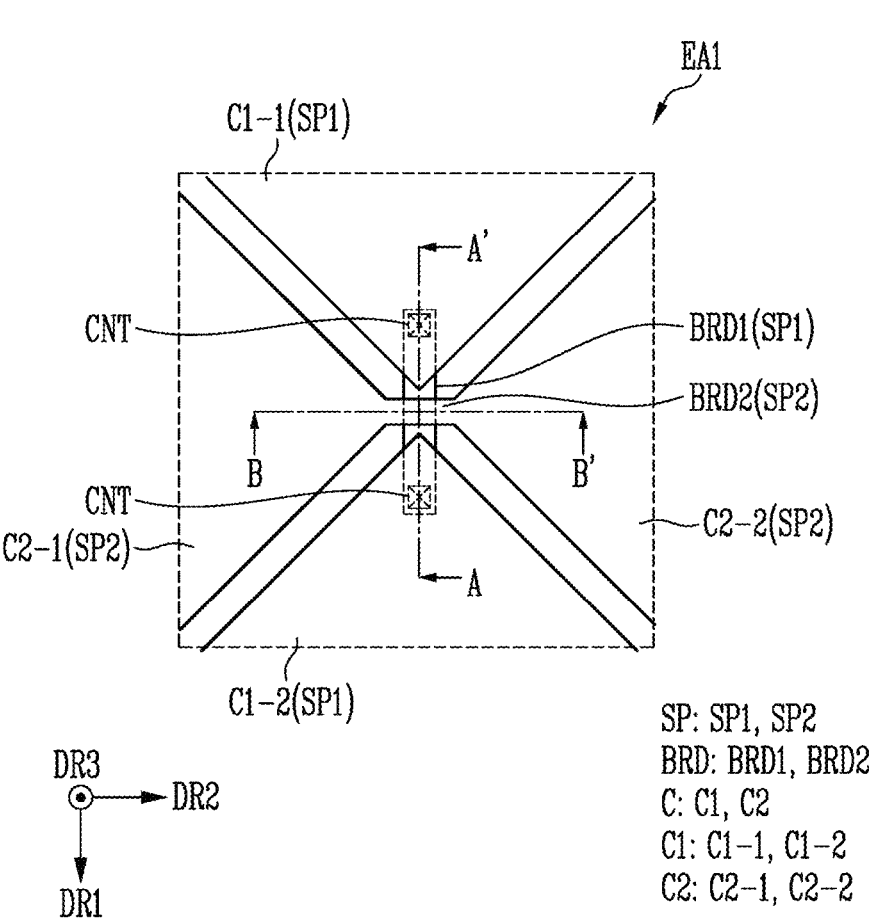
FIG. 10 is a schematic plan view illustrating sensing electrodes in accordance with an embodiment.
Figure 11:
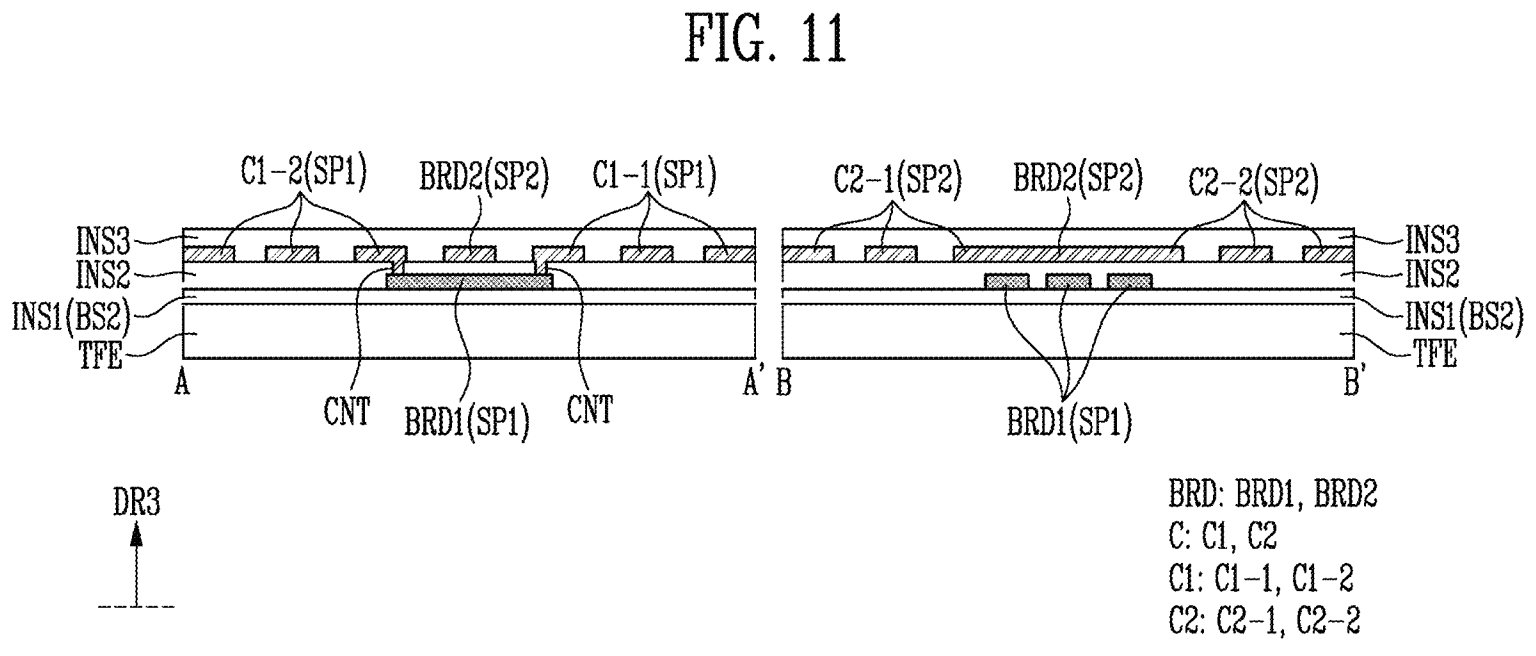

FIG. 8 is a schematic sectional view illustrating the sensor part TSP in accordance with an embodiment. FIG. 9 is a schematic plan view illustrating a sensing area in accordance with an embodiment. FIG. 10 is a schematic plan view illustrating sensing electrodes in accordance with an embodiment. FIG. 10 illustrates a schematic planar structure showing an area where the first sensing electrode SP1 and the second sensing electrode SP2 are adjacent to each other. FIG. 10 is a schematic enlarged view of area EA1 of FIG. 9. FIG. 11 is a schematic sectional view illustrating the sensor part TSP in accordance with an embodiment. FIG. 11 illustrates a schematic cross-sectional structure taken along line A-A' of FIG. 10, and a cross-sectional structure taken along line B-B' of FIG. 10

Referring to FIGS. 8 to 11, the sensor part TSP may be disposed on the encapsulation layer TFE. The sensor part TSP may include a first insulating layer INS1, a first conductive pattern layer CP1, a second insulating layer INS2, a second conductive pattern layer CP2, and a third insulating layer INS3.

In an embodiment, the first conductive pattern layer CP1 and the second conductive pattern layer CP2 may be patterned in one area to form sensing electrodes SP. For example, a portion of each of the first conductive pattern layer CP1 and the second conductive pattern layer CP2 may form a first sensing electrode SP1. A portion of the first conductive pattern layer CP1 may form a second sensing electrode SP2. However, the disclosure is not limited thereto.

The first insulating layer INS1 may be disposed on the encapsulation layer TFE. The first insulating layer INS1 may form the second base layer BS2 and thus provide an area in which the first conductive pattern layer CP1, the second insulating layer INS2, the second conductive pattern layer CP2, and the third insulating layer INS3 are disposed.

The first conductive pattern layer CP1 may be disposed on the first insulating layer INS1. The second conductive pattern layer CP2 may be disposed on the second insulating layer INS2. The first conductive pattern layer CP1 and the second conductive pattern layer CP2 may be spaced apart from each other with the second insulating layer INS2 interposed therebetween.

The first conductive pattern layer CP1 and the second conductive pattern layer CP2 each may include a single metallic layer or multiple metallic layers. The first conductive pattern layer CP1 and the second conductive pattern layer CP2 each may include at least one of various metals including gold (Au), silver (Ag), aluminum (Al), molybdenum (Mo), chrome (Cr), titanium (Ti), nickel (Ni), neodymium (Nd), copper (Cu), platinum (Pt), and the like, or an alloy thereof. In an embodiment, the first conductive pattern layer CP1 and the second conductive pattern layer CP2 each may include at least one of various transparent conductive materials including at least one among a silver nanowire (AgNW), indium tin oxide (ITO), indium zinc oxide (IZO), indium gallium zinc oxide (IGZO), antimony zinc oxide (AZO), indium tin zinc oxide (ITZO), zinc oxide (ZnO), tin oxide ($SnO_2$), carbon nanotubes, and graphene.

The second insulating layer INS2 may be disposed on the first conductive pattern layer CP1. The second insulating layer INS2 may be interposed between the first conductive pattern layer CP1 and the second conductive pattern layer CP2. The third insulating layer INS3 may be disposed on the second conductive pattern layer CP2.

The first insulating layer INS1 and the second insulating layer INS2 each may include inorganic material. The inorganic material may include one or more selected from the group consisting of silicon nitride ($SiN_x$), silicon oxide ($SiO_x$), silicon oxynitride ($SiO_xN_y$), and aluminum oxide ($AlO_x$). The third insulating layer INS3 may include organic material. The organic material may include one or more selected from the group consisting of acryl resin, epoxy resin, phenol resin, polyamide resin, and polyimide resin. However, the disclosure is not limited thereto.

The sensing electrodes SP may include a cell C and a bridge BRD. The cell C may have a relatively large surface area. The bridge BRD may have a relatively small surface area. Cells C adjacent to each other may be electrically connected to each other by the bridge BRD. The cell C may include a first cell C1 and a second cell C2. The bridge BRD may include a first bridge BRD1 and a second bridge BRD2.

In an embodiment, the first cell C1 and the second cell C2 may be formed of the second conductive pattern layer CP2. The first bridge BRD1 may be formed of the first conductive pattern layer CP1. The second bridge BRD2 may be formed of the second conductive pattern layer CP2.

In an embodiment, the cells C may form a mesh structure. For example, the second conductive pattern layer CP2 for forming the cells C may be patterned according to the mesh structure. In an embodiment, the first bridge BRD1 and the second bridge BRD2 may also form a mesh structure.

The first sensing electrode SP1 may have a structure in which the first cells C1 each having a relatively large surface area and the first bridge BRD1 having a relatively small surface area are connected to each other. For example, the first cell C1 may include a 1-1-th cell C1-1 and a 1-2-th cell C1-2. The first bridge BRD1 may electrically connect the 1-1-th cell C1-1 and the 1-2-th cell C1-2 to each other.

In an embodiment, the first bridge BRD1 may be electrically connected to the 1-1-th cell C1-1 through a contactor CNT, and may be electrically connected to the 1-2-th cell C1-2 through another contactor CNT. Hence, the first bridge BRD1 that is disposed on a layer different from that of the first cell C1 may electrically connect the 1-1-th cell C1-1 and the 1-2-th cell C1-2 to each other through the contactor CNT. In an embodiment, the contactor CNT may pass through the second insulating layer INS2.

The second sensing electrode SP2 may have a structure in which the second cells C2 each having a relatively large surface area and the second bridge BRD2 having a relatively small surface area are connected to each other. For example, the second cell C2 may include a 2-1-th cell C2-1 and a 2-2-th cell C2-2. The second bridge BRD2 may electrically connect the 2-1-th cell C2-1 and the 2-2-th cell C2-2 to each other.

The first cell C1 and the second cell C2 each may generally have a rhombus shape. However, the shape of each of the first cell C1 and the second cell C2 is not particularly limited to the foregoing.

In an embodiment, in a plan view, the 2-1-th sensing line SW2-1 may pass through an area in which the cells C are disposed. The 2-1-th sensing line SW2-1 may extend in a direction in which the first bridge BRD1 extends. The 2-1-th sensing line SW2-1 may extend in a direction different from a direction in which the second bridge BRD2 extends.

In an embodiment, the 2-1-th sensing line SW2-1 may be disposed between the first auxiliary line RL1 and the second auxiliary line RL2. A plurality of 2-1-th sensing lines SW2-1 may be disposed between the first auxiliary line RL1 and the second auxiliary line RL2. The number of 2-1-th sensing lines SW2-1 disposed between the first auxiliary line RL1 and the second auxiliary line RL2 is not particularly limited.

Figure 12:
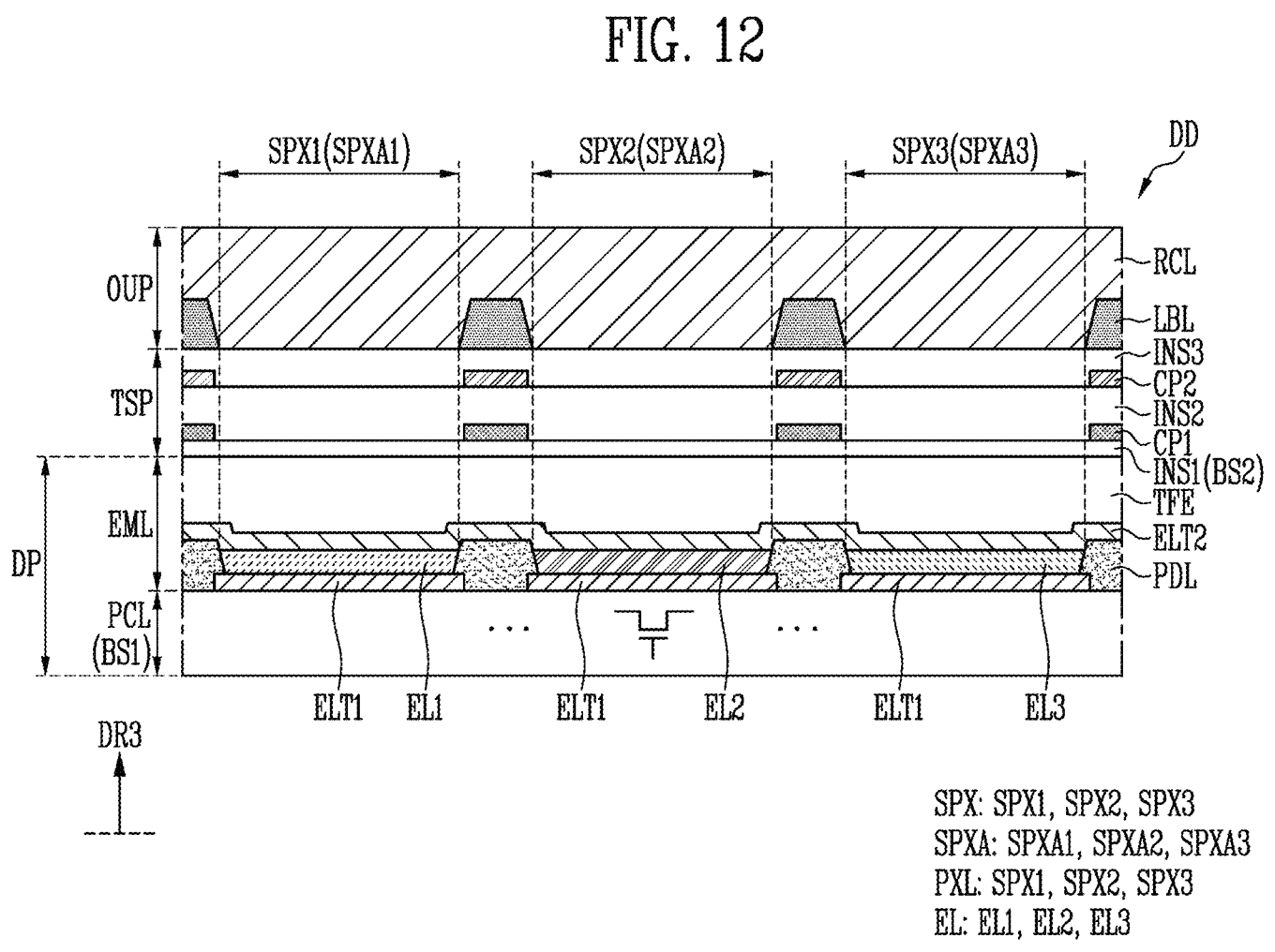

Next, a cross-sectional structure of the display device DD in accordance with an embodiment will be described with reference to FIG. 12. FIG. 12 is a schematic sectional view illustrating the display device DD in accordance with an embodiment.

Referring to FIG. 12, the emission layer EL may include a first emission layer EL1 included in the first sub-pixel SPX1, a second emission layer EL2 included in the second sub-pixel SPX2, and a third emission layer EL3 included in the third sub-pixel SPX3. The first emission layer EL1 may emit a first color of light (e.g., red light), and may form a first sub-pixel area SPXA1. The second emission layer EL2 may emit a second color of light (e.g., green light), and may form a second sub-pixel area SPXA2. The third emission layer EL3 may emit a third color of light (e.g., blue light), and may form a third sub-pixel area SPXA3. However, the disclosure is not limited to the foregoing. In an embodiment, the first to third emission layers EL1, EL2, and EL3 may emit the same color of light. The display device DD may further include a color filter layer and/or a quantum-dot layer, thus providing a full-color sub-pixel structure.

In the sensor part TSP, the first conductive pattern layer CP1 and the second conductive pattern layer CP2 may be disposed on different layers, thus forming the structure of the sensing electrodes SP.

The outer part OUP may be disposed on the sensor part TSP. The outer part OUP may include the light blocking layer LBL and the reflection control layer RCL.

The light blocking layer LBL may overlap the first conductive pattern layer CP1 and the second conductive pattern layer CP2, in a plan view. The light blocking layer LBL may include light blocking material, but the disclosure is not limited thereto.

The reflection control layer RCL may selectively absorb light in one wavelength range, and control the reflectivity and the color sense. In an embodiment, the reflection control layer RCL may include a dye, a pigment, or a combination thereof. For example, the reflection control layer RCL may include one or more selected from the group consisting of an oxazine-based compound, a cyanine-based compound, a tetraazaporphyrin-based compound, and a squarylium-based compound, but the disclosure is not limited thereto.

The cross-sectional structure of the display device DD in accordance with an embodiment is not limited to the foregoing example. Next, the electrodes and the lines that form the sensor part TSP in accordance with an embodiment will be described in detail with reference to FIGS. 13 to 20. Description overlapping that of the embodiments described above will be simplified, or may not be repeated.

First, a display device DD in accordance with a first embodiment will be described with reference to FIGS. 13 to 17.

FIGS. 13 to 17 are schematic views each illustrating the display device DD in accordance with the first embodiment.

Figure 13:
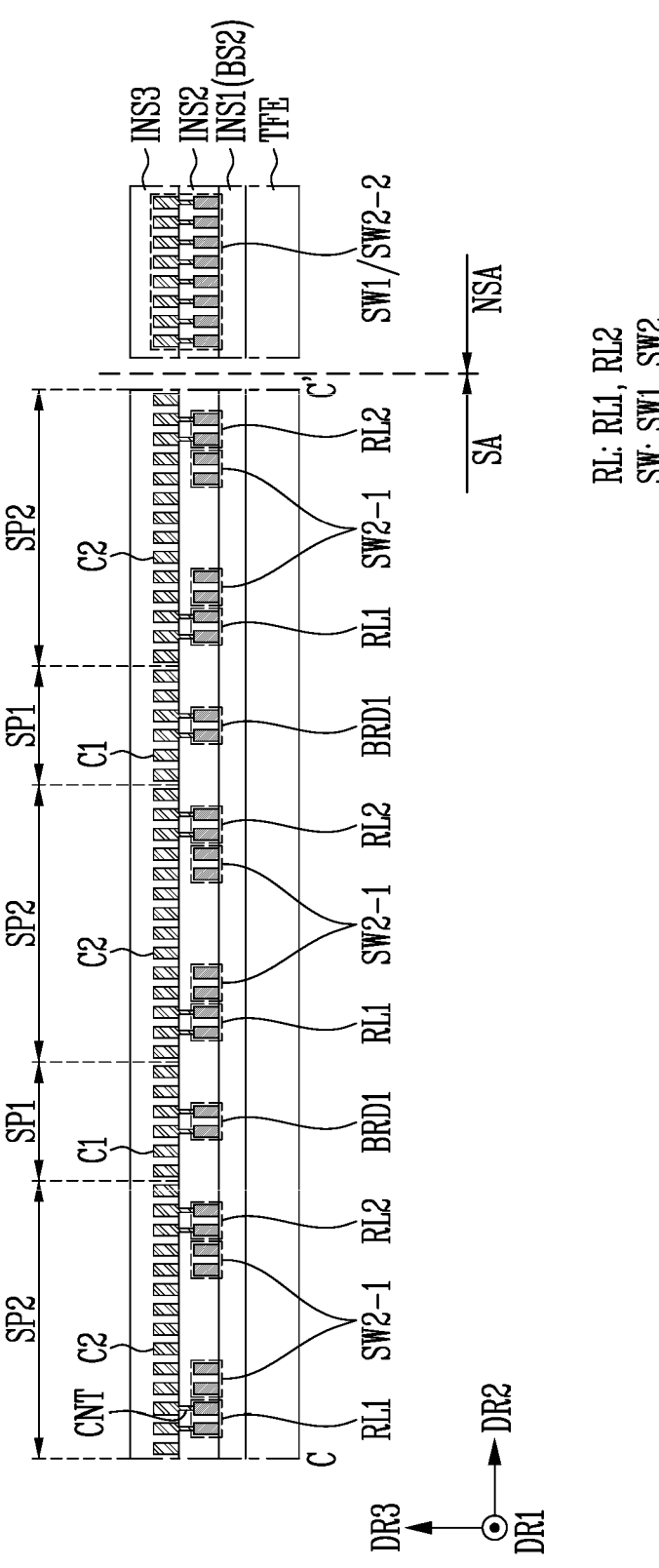
FIGS. 13, 14, 15, 16 and 17 are schematic views each illustrating a display device in accordance with a first embodiment.
Figure 14:
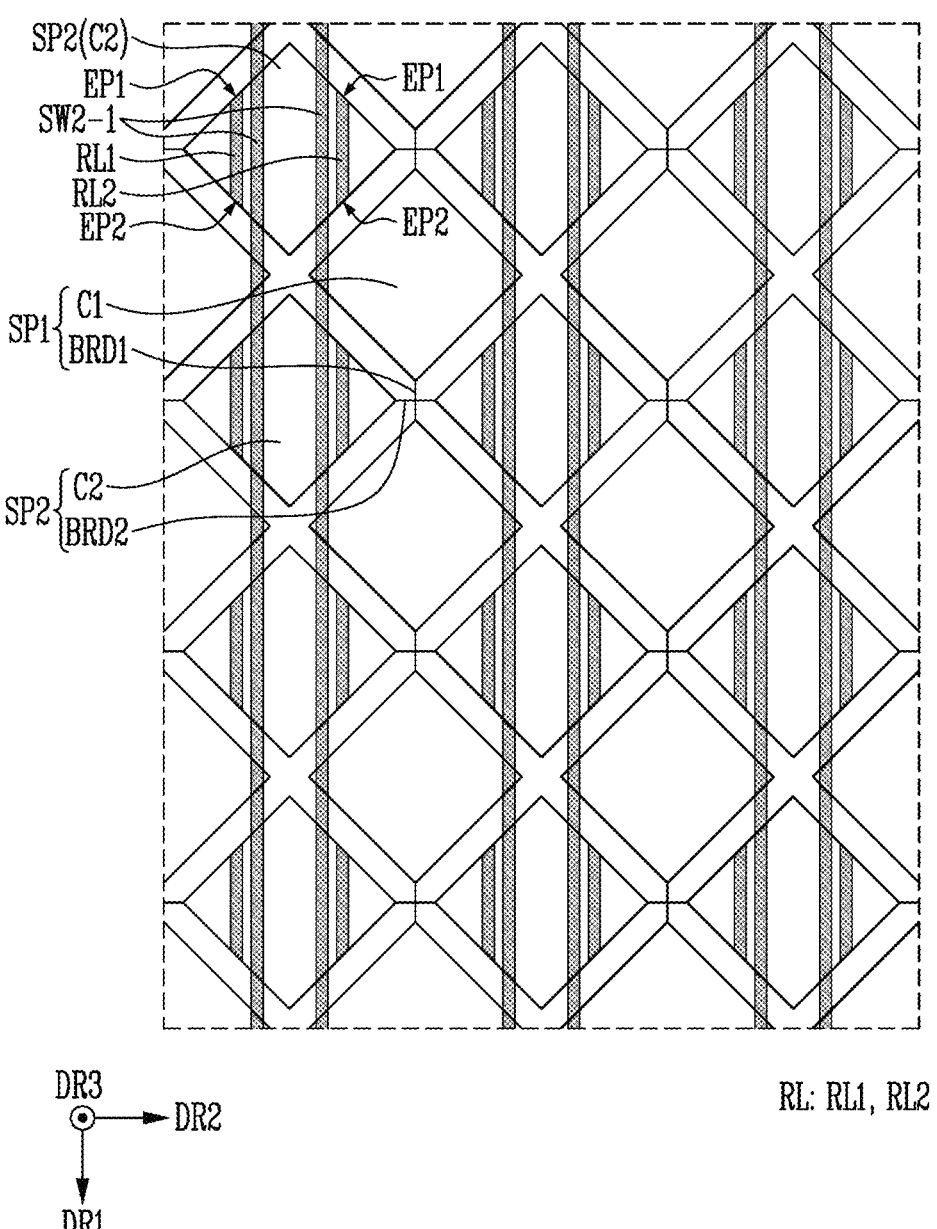
Figure 15:
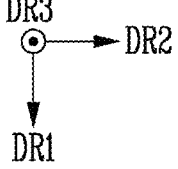
Figure 16:
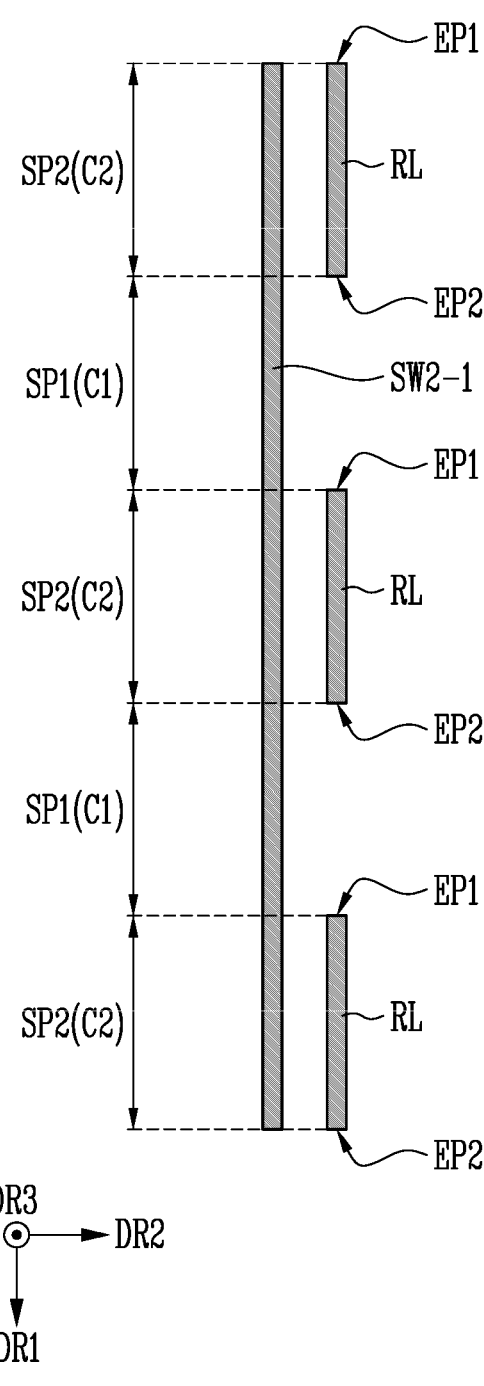
Figure 17:
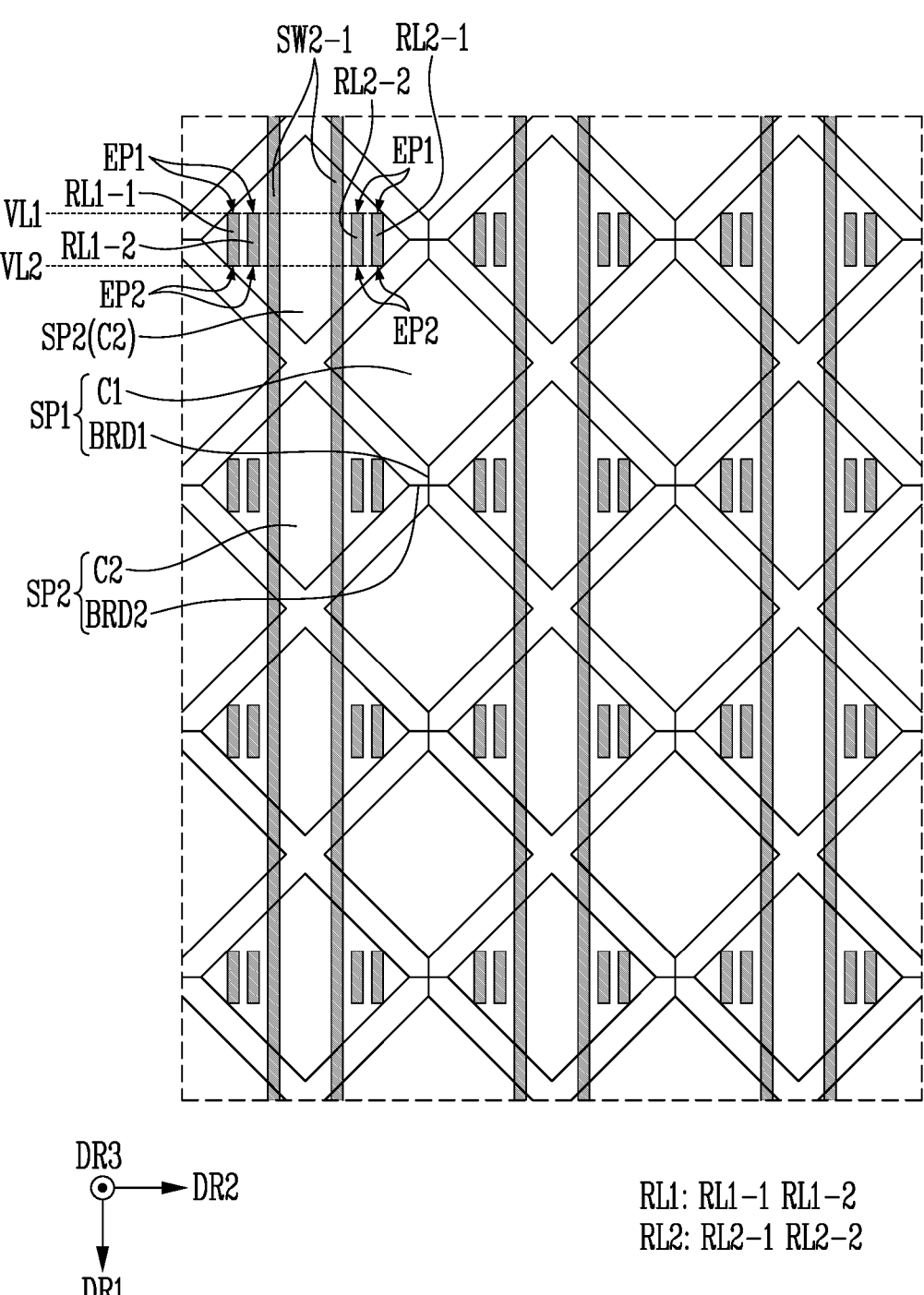

FIG. 13 is a schematic sectional view taken along line C-C' of FIG. 9, and schematically illustrates a cross-sectional structure of the display device DD in accordance with the first embodiment. FIG. 13 illustrates some areas of the sensing area SA and some areas of the non-sensing area NSA. FIGS. 14 to 17 schematically illustrate a planar structure of the display device DD in accordance with the first embodiment. FIGS. 14 to 17 illustrate some areas of the sensing area SA.

The first sensing electrode SP1 and the second sensing electrode SP2 may be adjacent to each other so that a capacitance for obtaining information about a touch event from the user can be formed. Cells C of each of the first sensing electrode SP1 and the second sensing electrode SP2 may be formed of the second conductive pattern layer CP2 and thus generally adjacent to a surface to which touch input from the user is to be applied.

In an embodiment, the first sensing line SW1 and the 2-2-th sensing line SW2-2 may be disposed in the non-sensing area NSA. In an embodiment, each of the first sensing line SW1 and the 2-2-th sensing line SW2-2 may have a multilayer structure formed of the first conductive pattern layer CP1 and the second conductive pattern layer CP2. In this case, the first sensing line SW1 and the 2-2-th sensing line SW2-2 may be reduced in resistance.

The auxiliary lines RL and the 2-1-th sensing lines SW2-1 may be formed of the first conductive pattern layer CP1. For example, the auxiliary lines RL and the 2-1-th sensing lines SW2-1 may be disposed under the cells C. For instance, the auxiliary lines RL and the 2-1-th sensing lines SW2-1 may be more adjacent to the second base layer BS2 than are the cells C.

The 2-1-th sensing lines SW2-1 may be disposed under the cells C, and may supply information about a capacitance recognized on the corresponding Rx row to the 2-2-th sensing lines SW2-2.

Each of the first auxiliary line RL1 and the second auxiliary line RL2 may be disposed under the cells C, and may be configured to receive an electrical signal.

For example, the auxiliary line RL may be electrically connected to the cells C formed of the second conductive pattern layer CP2, so that the auxiliary line RL may receive sensing signals to be supplied to the cells C. For example, each of the first auxiliary line RL1 and the second auxiliary line RL2 may be electrically connected to the second sensing electrode SP2 through a contactor CNT. Each of the first auxiliary line RL1 and the second auxiliary line RL2 may be electrically connected to the second cell C2 through a contactor CNT. In an embodiment, each of the first auxiliary line RL1 and the second auxiliary line RL2 may be electrically connected to the second bridge BRD2 through a contactor CNT.

Here, the auxiliary line RL may receive a sensing signal to be applied to the second sensing electrode SP2 disposed in an area in which the corresponding auxiliary linen RL is disposed. For example, the auxiliary line RL may generally extend in the first direction DR1, and may be cut in at least some areas. The auxiliary line RL may form ends EP1 and EP2 in at least some areas. For example, the auxiliary line RL may include a plurality of auxiliary lines. Each of the plurality of auxiliary lines may overlap the second sensing electrode SP2, in a plan view. Each of the plurality of auxiliary lines may overlap the second cell C2, in a plan view. Each of the first end EP1 and the second end EP2 of the auxiliary line RL may overlap an edge area of the second cell C2, or may be adjacent to the edge area. The edge area may refer to an area capable of defining the shape of the second cell C2.

In an embodiment, the auxiliary line RL may not overlap, in the second direction DR, an area in which the first sensing electrode SP1 is disposed. The auxiliary line RL may not overlap the first cell C1. Hence, the auxiliary line RL may form no capacitance with the first sensing electrode SP1 in an unrelated area, so that a risk of damage to touch sensing performance can be reduced.

In an embodiment, in a plan view, each of the auxiliary lines RL may be disposed in an area in which the corresponding second cell C2 is disposed. For example, the ends of the auxiliary line RL may correspond to the edge area of the second cell C2. In this case, each of the auxiliary lines RL may be supplied with a sensing signal (e.g., an Rx signal) to be applied to the corresponding second sensing electrode SP2.

In an embodiment, the auxiliary line RL may be supplied with a sensing signal defined on the corresponding Rx row, and may form a capacitance with the adjacent first sensing electrode SP1. Because the formed capacitance is related to a sensing signal defined on the second sensing electrode SP2 corresponding to an area in which the auxiliary line RL is disposed, sensing signals for the second sensing electrodes SP2 may be prevented from being crossed, and a ghost touch risk may be reduced.

Furthermore, the auxiliary line RL may form a capacitance with the first sensing electrode SP1. The first auxiliary line RL1 and the second auxiliary line RL2 may enclose the 2-1-th sensing line SW2-1 in the area in which the second cell C2 is disposed, so that a sensing signal applied to the 2-1-th sensing line SW2-1 may be shielded from external effects, and a risk of the sensing signals being crossed may be mitigated.

In another example, the display device DD may further include a ground line. The auxiliary line RL may be electrically connected to the ground line. In this case, the auxiliary line RL may be supplied with a ground signal. Furthermore, in a manner as that described above, the auxiliary line RL may block the 2-1-th sensing line SW2-1, and thus prevent the 2-1-th sensing line SW2-1 from forming a capacitance with the first sensing electrode SP1 adjacent thereto.

In an embodiment, the degree of freedom in electrode design may be enhanced. For example, to design the first conductive pattern layer CP1 and the second conductive pattern layer CP2, a capacitance between adjacent electrodes and resistance of the electrodes may be taken into account. Here, to reduce the resistance of the electrodes, there is a need of increase in thickness of the first conductive pattern layer CP1 and the second conductive pattern layer CP2. However, in the case where the thicknesses of the first conductive pattern layer CP1 and the second conductive pattern layer CP2 are increased, a facing surface area between the electrodes may be increased, whereby there is a risk of occurrence of a undesired capacitance. However, according to an embodiment, the structure capable of preventing an undesired capacitance from being formed may be realized. Thus, the first conductive pattern layer CP1 and the second conductive pattern layer CP2 may be fabricated to have suitable resistance without a risk of the undesired capacitance.

In an embodiment, each of the first auxiliary line RL1 and the second auxiliary line RL2 that enclose the 2-1-th sensing line SW2-1 may include a plurality of auxiliary lines.

For example, the first auxiliary line RL1 may include a 1-1-th auxiliary line RL1-1 and a 1-2-th auxiliary line RL1-2. For example, the second auxiliary line RL2 may include a 2-1-th auxiliary line RL2-1 and a 2-2-th auxiliary line RL2-2.

In an embodiment, the 1-1-th auxiliary line RL1-1 and the 2-1-th auxiliary line RL2-1 may be spaced farther apart form a central area of the second cell C2 than are the 1-2-th auxiliary line RL1-2 and the 2-2-th auxiliary line RL2-2. For instance, the 1-1-th auxiliary line RL1-1 and the 2-1-th auxiliary line RL2-1 may be spaced farther apart form a central area of the 2-1-th sensing line SW2-1 than are the 1-2-th auxiliary line RL1-2 and the 2-2-th auxiliary line RL2-2.

In an embodiment, the 1-2-th auxiliary line RL1-2 may be disposed between the 1-1-th auxiliary line RL1-1 and the 2-1-th sensing line SW2-1. The 2-2-th auxiliary line RL2-2 may be disposed between the 2-1-th auxiliary line RL2-1 and the 2-1-th sensing line SW2-1.

In an embodiment (refer to FIG. 15), the respective ends of the auxiliary lines SL may be disposed along the edge of the second cell C2.

In an embodiment, the 1-1-th auxiliary line RL1-1 may be shorter than the 1-2-th auxiliary line RL1-2. The 2-1-th auxiliary line RL2-1 may be shorter than the 2-2-th auxiliary line RL2-2. Hence, the ends EP1 and EP2 of each of the 1-1-th auxiliary line RL1-1, the 1-2-th auxiliary line RL1-2, the 2-1-th auxiliary line RL2-1, and the 2-2-th auxiliary line RL2-2 may be disposed to correspond to the outer shape of the second cell C2.

For example, the respective first ends EP1 of the 1-1-th auxiliary line RL1-1, the 1-2-th auxiliary line RL1-2, the 2-1-th auxiliary line RL2-1, and the 2-2-th auxiliary line RL2-2 may be arranged along the edge of the second cell C2. The respective second ends EP2 of the 1-1-th auxiliary line RL1-1, the 1-2-th auxiliary line RL1-2, the 2-1-th auxiliary line RL2-1, and the 2-2-th auxiliary line RL2-2 may be arranged along the edge of the second cell C2.

In this case, a surface area with which and the second cell C2 and the auxiliary lines RL that are formed of the first conductive pattern layer CP1 overlap each other may be increased. Furthermore, because the 2-1-th sensing line SW-1 can be more closely blocked by the auxiliary lines RL, the risk of sensing signals being closed can be more reliably prevented.

In an embodiment (refer to FIG. 17), the ends EP1 and EP2 of the auxiliary line RL may be disposed in the entirety of an internal area of the second cell C2.

Here, the ends EP1 and EP2 of each of the 1-1-th auxiliary line RL1-1 and the 2-1-th auxiliary line RL2-1 may be disposed to correspond to the edge area of the second cell C2, in a manner similar to that described above with reference to FIG. 14.

The 1-2-th auxiliary line RL1-2 and the 2-2-th auxiliary line RL2-2 may be disposed in an area in which the second cell C2 is defined (or disposed). For example, the ends EP1 and EP2 of each of the 1-2-th auxiliary line RL1-2 and the 2-2-th auxiliary line RL2-2 may not overlap the edge area of the second cell C2, in a plan view. In an embodiment, the ends EP1 and EP2 of each of the 1-2-th auxiliary line RL1-2 and the 2-2-th auxiliary line RL2-2 may be disposed in the internal area of the second cell C2.

In an embodiment, the respective first ends EP1 of the 1-1-th auxiliary line RL1-1, the 1-2-th auxiliary line RL1-2, the 2-1-th auxiliary line RL2-1, and the 2-2-th auxiliary line RL2-2 may be disposed parallel to each other along a first imaginary line VL1. The first imaginary line VL1 may be an imaginary extension line corresponding to a direction (e.g., the second direction DR2) in which the second cell C2 extends. The respective second ends EP2 of the 1-1-th auxiliary line RL1-1, the 1-2-th auxiliary line RL1-2, the 2-1-th auxiliary line RL2-1, and the 2-2-th auxiliary line RL2-2 may be disposed parallel to each other along a second imaginary line VL2. The second imaginary line VL2 may be an imaginary extension line corresponding to a direction (e.g., the second direction DR2) in which the second cell C2 extends. In this case, because an area in which an etching process for patterning the auxiliary line RL is performed may be defined to extend in one direction, the fabrication process may be improved in convenience. In an embodiment, the distance by which the auxiliary line RL and the 2-1-th sensing line SW2-1 are spaced apart from each other may correspond to the size of the sub-pixel area SPXA. Hence, even in the case where the auxiliary line RL and the 2-1-th sensing line SW2-1 are disposed, the display device DD may also have suitable luminance.

Next, a display device DD in accordance with a second embodiment will be described with reference to FIGS. 18 to 20. Descriptions overlapping that of the embodiments described above will be simplified, or may not be repeated. The second embodiment will be described focused on differences from the first embodiment described above.

Figure 18:
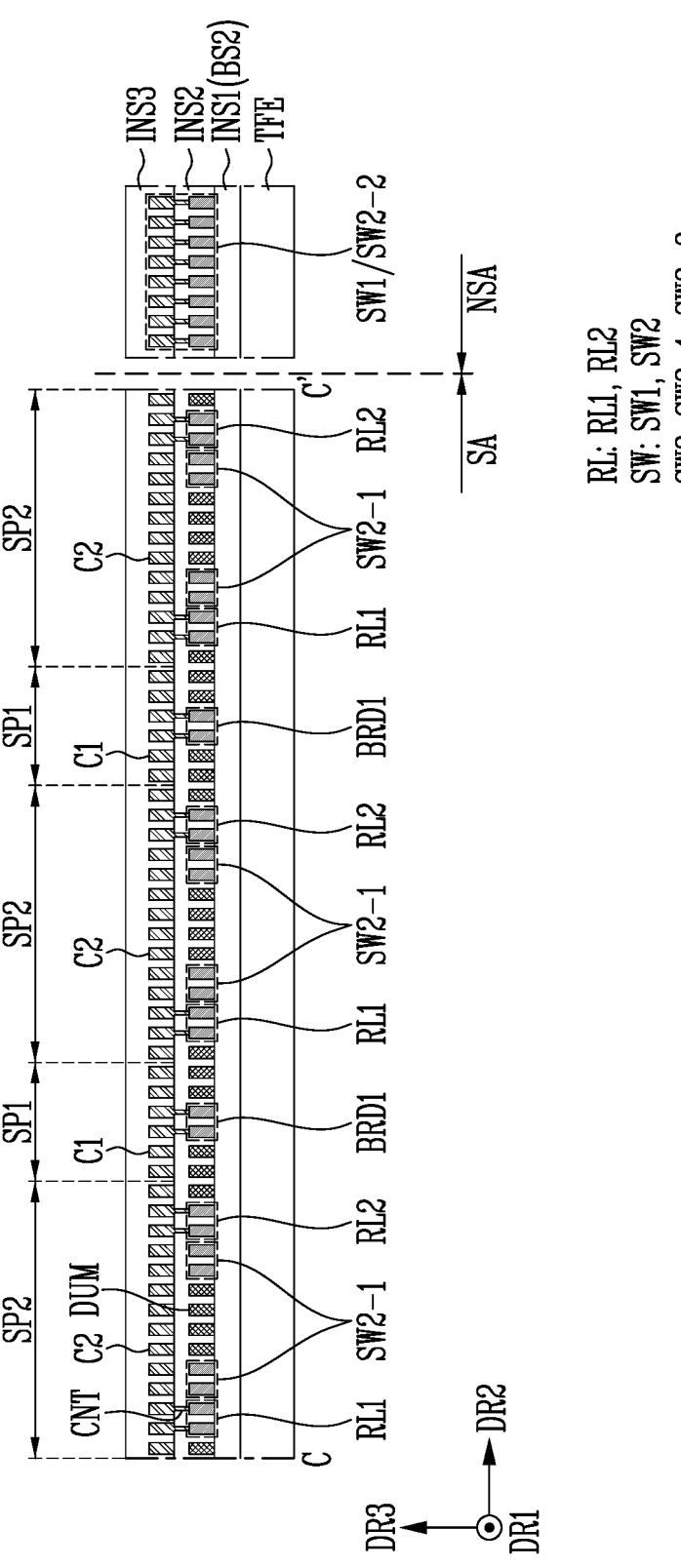
FIGS. 18, 19 and 20 are schematic views each illustrating a display device in accordance with a second embodiment.
Figure 19:
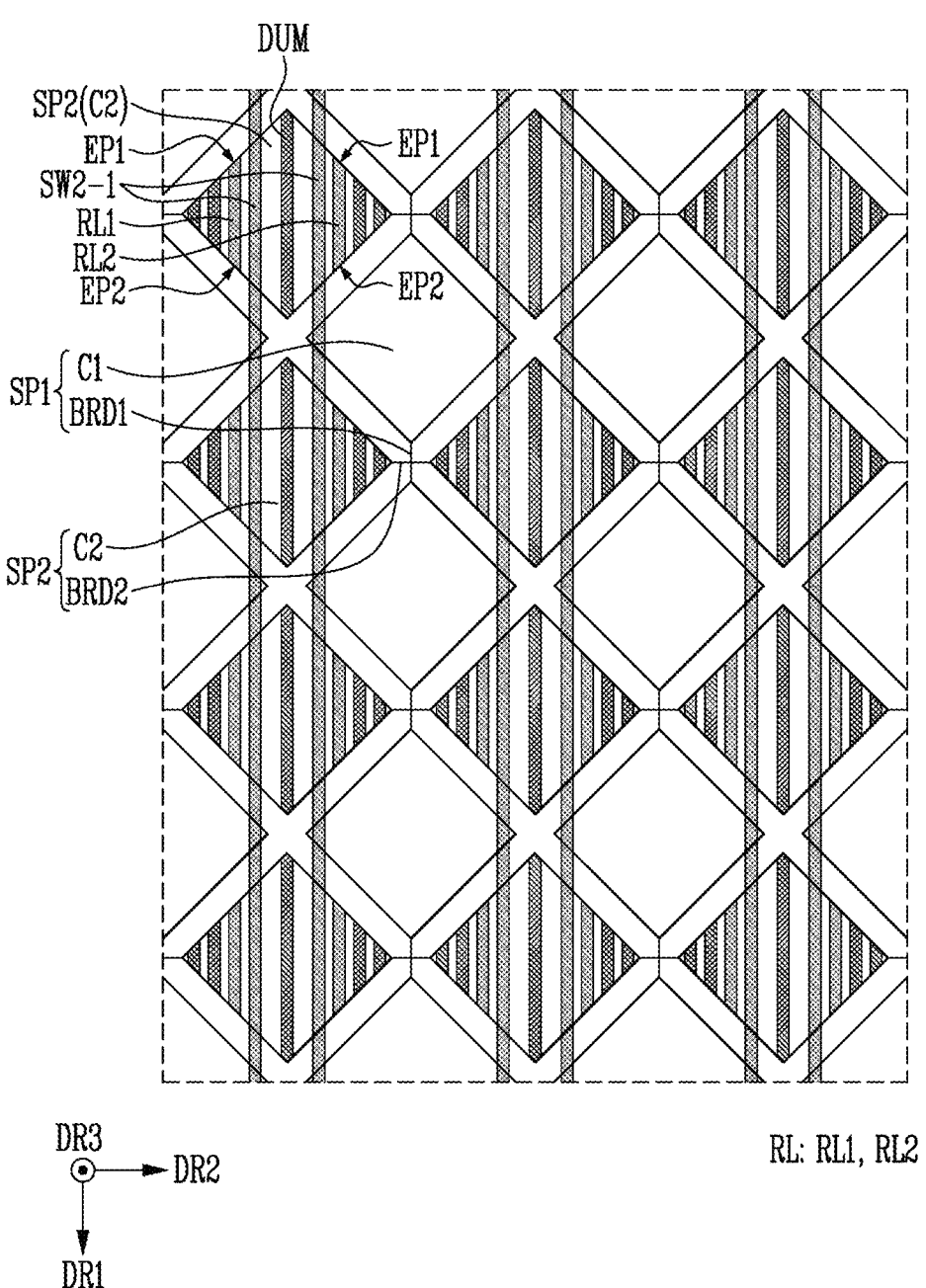
Figure 20:
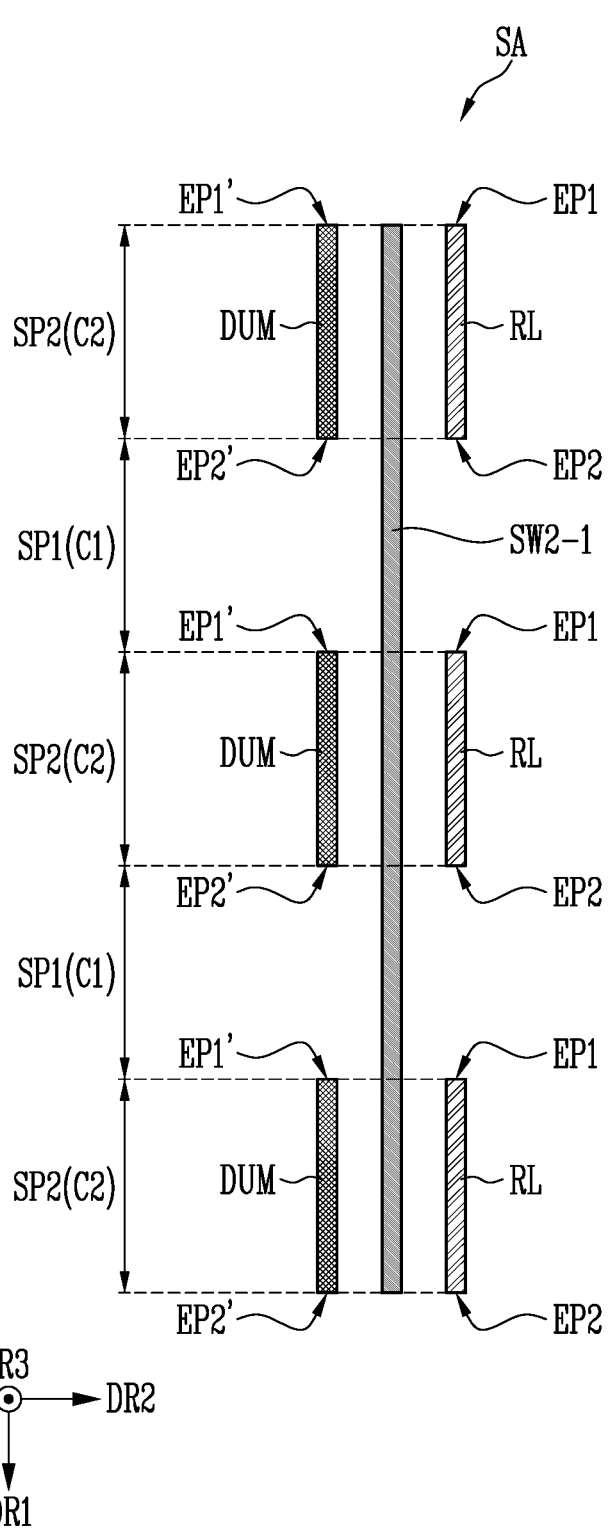

FIGS. 18 to 20 are schematic views each illustrating the display device DD in accordance with the second embodiment. FIG. 18 is a schematic sectional view taken along line C-C' of FIG. 9, and schematically illustrates a cross-sectional structure of the display device DD in accordance with the second embodiment. FIG. 18 illustrates some areas of the sensing area SA and some areas of the non-sensing area NSA. FIGS. 19 and 20 schematically illustrate a planar structure of the display device DD in accordance with the second embodiment. FIGS. 19 and 20 illustrate some areas of the sensing area SA.

The sensor part TSP (or the display device DD) may further include a dummy line DUM. In FIGS. 18 to 20, to clearly distinguish components from each other, the dummy line DUM is expressed in a pattern different from that of the auxiliary line RL although the dummy line DUM may be formed of the first conductive pattern layer CP1 in the same manner as that of the auxiliary line RL.

In an embodiment, the dummy line DUM may be disposed under the cells C, and may be formed of the first conductive pattern layer CP1. The dummy line DUM may overlap a conductive structure formed in the second conductive pattern layer CP2, in a plan view. The dummy line DUM may overlap the second cell C2, in a plan view. In an embodiment, the structure of the dummy line DUM may be substantially the same as the structure of the cells C formed of the first conductive pattern layer CP1.

The dummy line DUM may not be electrically connected to the first sensing electrode SP1 and the second sensing electrode SP2. The dummy line DUM may be supplied with no sensing signal. For example, the dummy line DUM may be supplied with no Tx signal, and may be supplied with no Rx signal.

The dummy line DUM may extend in the same direction as a direction (e.g., the first direction DR1) in which the auxiliary line RL and the 2-1-th sensing line SW2-1 extend.

The dummy line DUM may be disposed in an area in which the auxiliary line RL and the 2-1-th sensing line SW2-1 are not disposed. The dummy line DUM may be disposed, to overlap the second conductive pattern layer CP2, in an area in which the auxiliary line RL and the 2-1-th sensing line SW2-1 are not disposed. Hence, the dummy line DUM may enhance the visibility of the display device DD. Experimentally, in the case where the conductive structures of the first conductive pattern layers CP1 are selectively disposed in some areas, the visibility of the display device DD may deteriorate. However, according to an embodiment, to enable the first conductive pattern layer CP1 to be patterned in response to the disposition structure of the second conductive pattern layer CP2, the dummy line DUM may be disposed in the area in which the auxiliary line RL and the 2-1-th sensing line SW2-1 are not disposed. Hence, the risk of damage to the visibility of the display device DD may be reduced, and the display device DD having a high quality may be fabricated.

In an embodiment, the dummy line DUM may extend in the first direction DR1, and may be cut in at least some areas. The dummy line DUM may form ends EP1' and EP2' in at least some areas.

For example, the dummy line DUM may include a plurality of dummy lines. Each of the plurality of dummy lines may overlap the second sensing electrode SP2, in a plan view. Each of the plurality of dummy lines may overlap the second cell C2, in a plan view. In an embodiment, the dummy line DUM may not overlap, in the second direction DR, an area in which the first sensing electrode SP1 is disposed. Each of the first end EP1' and the second end EP2' of the dummy line DUM may overlap an edge area of the second cell C2, or may be adjacent to the edge area.

In an embodiment, in a plan view, each of the dummy lines DUM may be disposed in an area in which the corresponding second cell C2 is disposed. For example, the ends EP1' and EP2' of the dummy line DUM may correspond to the edge area of the second cell C2. In this case, the ends of the dummy line DUM may be disposed along the shape of the second cell C2 in the same manner as the auxiliary line RL, and the risk of deterioration in visibility due to the first conductive pattern layer CP1 may be removed. However, the disclosure is not limited to the foregoing. In an embodiment, at least a portion of the dummy line DUM may overlap the first sensing electrode SP1.

Various embodiments of the disclosure may provide a touch sensor having high-quality touch performance resulting from improvement in reliability of touch input, and to a display device including the touch sensor.

While various embodiments have been described above, those skilled in the art will appreciate that various modifications, additions and substitutions are possible, without departing from the scope and spirit of the disclosure.

Therefore, the embodiments disclosed in this specification are only for illustrative purposes rather than limiting the technical spirit of the disclosure. The scope of the disclosure must be defined by the accompanying claims.

What is claimed is:

1. A touch sensor including a sensing area and a non-sensing area, and comprising:
   a sensor base layer;
   a first sensing electrode and a second sensing electrode each disposed on the sensor base layer in the sensing area;
   a first sensing line and a second sensing line each disposed on the sensor base layer, the first sensing line being electrically connected to the first sensing electrode, the second sensing line being electrically connected to the second sensing electrode; and
   an auxiliary line disposed on the sensor base layer, wherein the second sensing line comprises a 2-1-th sensing line disposed in the sensing area, and a 2-2-th sensing line disposed in the non-sensing area, and
   wherein the auxiliary line overlaps the second sensing electrode in a plan view, encloses at least a portion of the 2-1-th sensing line, and is electrically connected to the second sensing electrode.

2. The touch sensor according to claim 1,
   wherein the non-sensing area includes a pad area in which touch sensing pads are disposed, and
   wherein the first sensing line and the 2-2-th sensing line are disposed in an area between the pad area and the sensing area.

3. The touch sensor according to claim 2,
   wherein the first sensing electrode extends in a first direction, and the second sensing electrode extends in a second direction different from the first direction, and
   wherein the first sensing line and the 2-2-th sensing line overlap the sensing area in the first direction, and do not overlap the sensing area in the second direction in the area between the sensing area and the pad area.

4. The touch sensor according to claim 2,
   wherein the first sensing electrode comprises a transmitter pattern electrode,
   wherein the second sensing electrode comprises a receiver pattern electrode, and
   wherein a number of transmitter columns formed of the first sensing electrode is less than a number of receiver rows formed of the second sensing electrode.

5. The touch sensor according to claim 1,
   wherein the auxiliary line extends in a same direction as the first sensing electrode, and comprises a first auxiliary line and a second auxiliary line, and
   wherein the first auxiliary line is disposed on a first side of the 2-1-th sensing line, and the second auxiliary line is disposed on a second side of the 2-1-th sensing line.

6. The touch sensor according to claim 1,
   wherein the first sensing electrode comprises a transmitter pattern electrode extending in a first direction and forming transmitter columns,
   wherein the second sensing electrode comprises a receiver pattern electrode extending in a second direction different from the first direction and forming receiver rows,
   wherein the 2-1-th sensing line extends in the first direction,
   wherein the second sensing electrode comprises a 2-k-th sensing electrode forming a k-th receiver row, and a 2-m-th sensing electrode forming an m-th receiver row,
   wherein the 2-1-th sensing line comprises a k-th extended sensing line electrically connected to the 2-k-th sensing electrode, and an m-th extended sensing line electrically connected to the 2-m-th sensing electrode, where k is a natural number less than m, and
   wherein the k-th extended sensing line overlaps the 2-m-th sensing electrode in a plan view.

7. The touch sensor according to claim 6,
   wherein the auxiliary line is electrically connected to the 2-m-th sensing electrode in an area in which the 2-m-th sensing electrode is disposed, and
   wherein the k-th extended sensing line passes, in the first direction, through the area in which the 2-m-th sensing electrode is disposed.

8. The touch sensor according to claim 1,
   wherein the first sensing electrode comprises a first cell,
   wherein the second sensing electrode comprises a second cell, wherein the auxiliary line and the 2-1-th sensing line are formed of a first conductive pattern layer, wherein the first cell and the second cell are formed of a second conductive pattern layer, and wherein the first conductive pattern layer is disposed between the sensor base layer and the second conductive pattern layer.

9. The touch sensor according to claim 8, wherein the first sensing electrode extends in a first direction, wherein the auxiliary line extends in the first direction, and comprises a plurality of auxiliary lines each including a first end and a second end, wherein the first end is disposed adjacent to a portion of an edge area of the second cell, and wherein the second end is disposed adjacent to another portion of the edge area of the second cell.

10. The touch sensor according to claim 8, wherein a plurality of auxiliary lines do not overlap the first sensing electrode in a plan view.

11. The touch sensor according to claim 8, wherein the second cell has a rhombus shape, wherein the auxiliary line comprises a first auxiliary line disposed on a first side of the 2-1-th sensing line, and a second auxiliary line disposed on a second side of the 2-1-th sensing line, wherein the first auxiliary line comprises a 1-1-th auxiliary line and a 1-2-th auxiliary line, wherein the second auxiliary line comprises a 2-1-th auxiliary line and a 2-2-th auxiliary line, wherein the 1-2-th auxiliary line is disposed between the 1-1-th auxiliary line and the 2-1-th sensing line, wherein the 2-2-th auxiliary line is disposed between the 2-1-th auxiliary line and the 2-1-th sensing line, wherein a length of the 1-1-th auxiliary line is less than a length of the 1-2-th auxiliary line, and wherein a length of the 2-1-th auxiliary line is less than a length of the 2-2-th auxiliary line.

12. The touch sensor according to claim 8, wherein the 2-1-th sensing line extends in a first direction, wherein the second cell has a rhombus shape, wherein the auxiliary line comprises a first auxiliary line and a second auxiliary line each including a first end and a second end, the first auxiliary line being disposed on a first side of the 2-1-th sensing line, the second auxiliary line being disposed on a second side of the 2-1-th sensing line, wherein the first auxiliary line comprises a 1-1-th auxiliary line and a 1-2-th auxiliary line, wherein the second auxiliary line comprises a 2-1-th auxiliary line and a 2-2-th auxiliary line, wherein the 1-2-th auxiliary line is disposed between the 1-1-th auxiliary line and the 2-1-th sensing line, wherein the 2-2-th auxiliary line is disposed between the 2-1-th auxiliary line and the 2-1-th sensing line, wherein the respective first ends of the 1-1-th auxiliary line, the 1-2-th auxiliary line, the 2-1-th auxiliary line, and the 2-2-th auxiliary line are disposed along a first imaginary line extending in a second direction different from the first direction, and wherein the respective second ends of the 1-1-th auxiliary line, the 1-2-th auxiliary line, the 2-1-th auxiliary line, and the 2-2-th auxiliary line are disposed along a second imaginary line extending in the second direction.

13. The touch sensor according to claim 8, further comprising a dummy line formed of the first conductive pattern layer, wherein the dummy line extends in a direction identical to a direction in which the auxiliary line and the 2-1-th sensing line extend.

14. The touch sensor according to claim 13, wherein the dummy line overlaps the second cell in a plan view.

15. The touch sensor according to claim 13, wherein the dummy line includes a first end and a second end, and the first end and the second end of the dummy line are disposed along an edge area of the second cell.

16. The touch sensor according to claim 15, wherein the dummy line does not overlap the first sensing electrode in a plan view.

17. A touch sensor including a sensing area and a non-sensing area, and comprising:

a sensor base layer;

a transmitter pattern electrode disposed on the sensor base layer, and including first cells and a first bridge electrically connecting the first cells to each other;

a receiver pattern electrode disposed on the sensor base layer, and including second cells and a second bridge electrically connecting the second cells to each other;

an auxiliary line disposed on the sensor base layer, and including a first end and a second end;

a first sensing line electrically connected to the transmitter pattern electrode; and a second sensing line electrically connected to the receiver pattern electrode, wherein the auxiliary line is formed of a first conductive pattern layer, wherein the first cells and the second cells are formed of a second conductive pattern layer, wherein the first conductive pattern layer is disposed between the sensor base layer and the second conductive pattern layer, wherein the second sensing line comprises a 2-1-th sensing line disposed in the sensing area, and a 2-2-th sensing line disposed in the non-sensing area, wherein the auxiliary line comprises a first auxiliary line disposed on a first side of the 2-1-th sensing line, and a second auxiliary line disposed on a second side of the 2-2-th sensing line, and wherein the first end and the second end of the auxiliary line are disposed along an edge of each of the second cells.

18. The touch sensor according to claim 17, wherein the non-sensing area includes a pad area in which touch sensing pads are disposed, wherein the first sensing line and the 2-2-th sensing line are disposed in an area between the pad area and the sensing area, wherein the transmitter pattern electrode extends in a first direction, and the receiver pattern electrode extends in a second direction different from the first direction, and wherein the first sensing line and the 2-2-th sensing line overlap the sensing area in the first direction, and do not overlap the sensing area in the second direction in the area between the sensing area and the pad area.

19. The touch sensor according to claim 17, wherein the auxiliary line and the 2-1-th sensing line are formed of a first conductive pattern layer, wherein the first cells and the second cells are formed of a second conductive pattern layer, and wherein the first conductive pattern layer is disposed between the sensor base layer and the second conductive pattern layer.

20. A display device including a display area, a sensing area, and a non-sensing area, and comprising:

a display part including a light emitting element; and a sensor part provided on the display part, wherein the sensor part comprises: a sensor base layer; a first sensing electrode and a second sensing electrode disposed on the sensor base layer in the sensing area; a first sensing line and a second sensing line each disposed on the sensor base layer, the first sensing line being electrically connected to the first sensing electrode, the second sensing line being electrically connected to the second sensing electrode; and an auxiliary line disposed on the sensor base layer, wherein the second sensing line comprises a 2-1-th sensing line disposed in the sensing area, and a 2-2-th sensing line disposed in the non-sensing area, and wherein the auxiliary line overlaps the second sensing electrode in a plan view, and encloses at least a portion of the 2-1-th sensing line.

* * * * *